(12) United States Patent
Mellteg et al.

(10) Patent No.: US 9,507,901 B2
(45) Date of Patent: Nov. 29, 2016

(54) SWITCHED MODE POWER SUPPLY OUTPUT FILTER CONFIGURATION

(71) Applicant: Telefonaktiebolaget L M Ericsson (publ), Stockholm (SE)

(72) Inventors: Magnus Mellteg, Kalmar (SE); Magnus Karlsson, Oskarshamn (SE); Daniel Nilsson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 90 days.

(21) Appl. No.: 14/418,334

(22) PCT Filed: Dec. 1, 2014

(86) PCT No.: PCT/EP2014/076092
§ 371 (c)(1),
(2) Date: Jan. 29, 2015

(87) PCT Pub. No.: WO2015/149887
PCT Pub. Date: Aug. 10, 2015

(65) Prior Publication Data
US 2015/0331984 A1    Nov. 19, 2015

(30) Foreign Application Priority Data

Mar. 31, 2014  (WO) .................. PCT/EP2014/056436

(51) Int. Cl.
*G06F 17/50*    (2006.01)
*H02M 1/14*    (2006.01)
(Continued)

(52) U.S. Cl.
CPC ............ *G06F 17/5063* (2013.01); *H02M 1/14* (2013.01); *G06F 2217/04* (2013.01);
(Continued)

(58) Field of Classification Search
CPC G06F 17/5063; G06F 2217/08; H02M 1/14; H02M 1/44; H02M 3/07; H02M 1/126; H02M 3/156; H02M 3/157; H02M 3/158; H02M 3/33515; H02M 7/217; H01L 25/072; H01L 2924/14; H01L 2924/19041
See application file for complete search history.

(56) References Cited

U.S. PATENT DOCUMENTS 4,523,131 A * 6/1985 Zansky .............. H05B 41/3927
                                              315/206
5,418,707 A * 5/1995 Shimer ................. H01J 37/241
                                              307/82

(Continued)

OTHER PUBLICATIONS

Sharaf et al.; "Power quality enhancement using a unified switched capacitor compensator"; Year: 2003; Electrical and Computer Engineering, 2003. IEEE CCECE 2003. Canadian Conference on; vol. 1; pp. 331-333 vol. 1.*

(Continued)

*Primary Examiner* — Helen Rossoshek
(74) *Attorney, Agent, or Firm* — Myers Bigel, P.A.

(57) ABSTRACT

Method determines a configuration of capacitors in an output filter of a switched mode power supply (SMPS). Candidate configurations are generated, each associated with a respective cost function value calculated based on number of capacitors of each kind in the candidate configuration and cost assigned to each kind of capacitor. The candidate configurations are ordered based on their cost function values. A binary search through the ordered candidate configurations determines a capacitor configuration associated with a lowest cost function value to allow a defined load transient response requirement of the SMPS. Whether a candidate configuration allows the defined load transient response requirement of the SMPS is determined using a model of a SMPS having the candidate configuration of the output filter simulating deviation of output voltage of the SMPS in response to change in load current of the SMPS and determining whether the defined load transient response requirement is allowed.

41 Claims, 29 Drawing Sheets

(51) Int. Cl.
  *H02M 1/44* (2007.01)
  *H02M 3/07* (2006.01)
  *H01L 25/07* (2006.01)
  *H02M 1/12* (2006.01)
  *H02M 3/156* (2006.01)

(52) U.S. Cl.
  CPC ........ *G06F 2217/08* (2013.01); *H01L 25/072* (2013.01); *H02M 1/126* (2013.01); *H02M 1/44* (2013.01); *H02M 3/07* (2013.01); *H02M 3/156* (2013.01)

(56) References Cited

U.S. PATENT DOCUMENTS

| | | | | |
|---|---|---|---|---|
| 5,656,925 | A * | 8/1997 | Schie | G08B 7/062 323/202 |
| 5,745,358 | A * | 4/1998 | Faulk | H02M 3/33523 363/21.13 |
| 6,530,065 | B1 * | 3/2003 | McDonald | G06F 17/5036 716/102 |
| 6,661,311 | B2 * | 12/2003 | Delvart | H04N 7/102 333/12 |
| 7,157,886 | B2 * | 1/2007 | Agarwal | H02M 1/4208 323/207 |
| 7,518,886 | B1 * | 4/2009 | Lai | H02P 8/12 363/17 |
| 7,675,244 | B2 * | 3/2010 | Blondia | H05B 41/2882 315/209 R |
| 7,772,811 | B1 * | 8/2010 | Jain | H02M 3/157 323/224 |
| 7,966,588 | B1 * | 6/2011 | Perry | G06F 17/5036 707/E17.107 |
| 8,415,077 | B2 * | 4/2013 | Agarwal | G03F 7/70433 382/144 |
| 8,456,867 | B1 * | 6/2013 | Karlsson | H02M 1/36 323/901 |
| 8,698,469 | B1 * | 4/2014 | Latham, II | H02M 1/15 323/283 |
| 8,810,215 | B2 * | 8/2014 | Horman | 323/266 |
| 8,902,617 | B2 * | 12/2014 | Wahledow | 363/56.04 |
| 8,946,851 | B1 * | 2/2015 | McGregor | H01L 29/7835 257/492 |
| 9,087,164 | B2 * | 7/2015 | Perry | G06F 17/50 |
| 9,330,833 | B2 * | 5/2016 | Hu | H01F 27/323 |
| 9,362,832 | B2 * | 6/2016 | Karlsson | H02M 3/33507 |
| 2003/0111910 | A1 * | 6/2003 | Rostron | H02M 5/293 307/130 |
| 2004/0139413 | A1 * | 7/2004 | DeHon | G06F 17/5072 716/121 |
| 2007/0147098 | A1 * | 6/2007 | Mori | H02J 3/01 363/71 |
| 2010/0161259 | A1 * | 6/2010 | Kim | G05B 23/0283 702/63 |
| 2010/0325599 | A1 * | 12/2010 | Perry | G06F 17/50 716/122 |
| 2011/0188273 | A1 * | 8/2011 | Pansier | H02M 1/4225 363/44 |
| 2011/0260703 | A1 * | 10/2011 | Laur | H02M 3/1563 323/271 |
| 2012/0098553 | A1 * | 4/2012 | Karlsson | G01R 27/2605 324/684 |
| 2012/0105028 | A1 * | 5/2012 | Horman | H02M 1/15 323/266 |
| 2012/0274301 | A1 * | 11/2012 | Nakashima | H02M 3/1588 323/284 |
| 2012/0287681 | A1 * | 11/2012 | Wahledow | H02M 1/38 363/21.04 |
| 2013/0002218 | A1 * | 1/2013 | Thomas | H02M 3/156 323/282 |
| 2013/0003422 | A1 * | 1/2013 | Persson | H02M 1/36 363/21.01 |
| 2013/0113449 | A1 * | 5/2013 | Pietri | H02M 3/156 323/283 |
| 2013/0155727 | A1 * | 6/2013 | Karlsson | H02M 3/335 363/21.04 |
| 2013/0194843 | A1 * | 8/2013 | Ofek | H02J 7/0068 363/84 |
| 2013/0294111 | A1 * | 11/2013 | Persson | H02M 1/32 363/16 |
| 2013/0343094 | A1 * | 12/2013 | Karlsson | H02M 3/33507 363/17 |
| 2014/0218987 | A1 * | 8/2014 | Hu | H02M 1/4225 363/126 |
| 2014/0293662 | A1 * | 10/2014 | Persson | H02M 1/36 363/25 |
| 2015/0003116 | A1 * | 1/2015 | Karlsson | H02M 3/33538 363/17 |
| 2015/0055375 | A1 * | 2/2015 | Karlsson | H02M 3/33592 363/17 |
| 2015/0109825 | A1 * | 4/2015 | Karlsson | H02M 3/33507 363/17 |
| 2015/0244270 | A1 * | 8/2015 | Karlsson | H02M 3/33507 363/17 |
| 2015/0311789 | A1 * | 10/2015 | Larsson | H02M 1/15 323/282 |
| 2015/0333640 | A1 * | 11/2015 | Persson | H02M 3/33538 363/21.04 |
| 2015/0372605 | A1 * | 12/2015 | Karlsson | H02M 3/3376 363/21.06 |
| 2016/0056640 | A1 * | 2/2016 | Mao | H02J 50/10 307/104 |

OTHER PUBLICATIONS

Sarjeant et al.; "Capacitors"; Year: 1998; IEEE Transactions on Plasma Science; vol. 26, Issue: 5; pp. 1368-1392.*

Kirisken et al.; "Cost-benefit approach to degradation of electrolytic capacitors"; Year: 2014; 2014 Reliability and Maintainability Symposium; pp. 1-6.*

Mozar; "Voltage doubler protection circuit results in large cost savings"; Year: 1997; Consumer Electronics, 1997. ISCE '97., Proceedings of 1997 IEEE International Symposium on; pp. 133-137.*

International Search Report, International Application No. PCT/EP2014/076092, mailed Feb. 18, 2015, 3 pages.

Written Opinion of the International Searching Authority, International Application No. PCT/EP2014/076092, mailed Feb. 18, 2015, 7 pages.

Matthews, John H. et al. "Nelder-Mead Method." *Numerical Methods Using Matlabs*. Fourth ed. Upper Saddle River: Prentice-Hall Inc, 2004. 430-436. Print.

Nelder, J. A., and R. Mead. "A Simplex Method for Function Minimization." *The Computer Journal*. 7(4):308-13 (Dec. 1, 1965). Print.

Zhao, Zhenyu. "Design and Practical Implementation of Digital Auto-Tuning and Fast-Response Controllers for Low-Power Switch-Mode Power Supplies". Ph.D. Thesis. University of Toronto, 2008, 153 pp.

* cited by examiner

For each candidate configuration having a plurality of different capacitor arrangements all having the same value of the cost function, select a single one of the arrangements.

Select a subset of the plurality of different arrangements based on one of a total price and a total physical size of the capacitors in each of the plurality of different arrangements. — S152-2

Select an arrangement from the subset based on the other of the total price and the total physical size of the capacitors in each of the arrangements in the subset. — S154-2

Return

Fig. 19

SWITCHED MODE POWER SUPPLY OUTPUT FILTER CONFIGURATION

CROSS REFERENCE TO RELATED APPLICATIONS

This application is a 35 U.S.C. §371 national stage application of PCT International Application No. PCT/EP2014/076092, filed on 1 Dec. 2014, which itself claims benefit of and priority to PCT/EP2014/056436, filed on 31 Mar. 2014, the disclosure and content of both of which are incorporated by reference herein in their entirety.

TECHNICAL FIELD

The present invention generally relates to the field of switched mode power supplies (sometimes referred to as switch mode power supplies or switching mode power supplies) and more specifically to the determination of a configuration of capacitors in an output filter of a switched mode power supply.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. A SMPS may take the form of a rectifier (AC/DC converter), a DC/DC converter, a frequency changer (AC/AC) or an inverter (DC/AC).

A switched mode power supply typically has at its output banks of capacitors of different kinds that are arranged in a low-pass filter configuration to low-pass filter the output signal of the switching circuitry of the SMPS that includes the switching element(s). Moreover, the different kinds of capacitor generally have different costs, in terms of their price and/or the area they take up on a circuit board (which often needs to be as small as possible), or other design constraints.

As electronic systems become more and more cost- and space-limited, there is an increasing need to optimise the decoupling filter of the switched mode power supplies that power these systems, particularly as the decoupling filter of the SMPS tends to occupy a large proportion of the board space. An optimisation of the configuration of the decoupling filter (in terms of the numbers of capacitors of different kinds, and how these capacitors are arranged throughout the filter structure) can thus save valuable board space as well as cost. However, the requirement for a steady DC voltage, which is common to many modern electronics systems, imposes tough restrictions on the configuration of the decoupling filter, which complicates the task of selecting an optimum configuration of the capacitors therein.

Conventional approaches to designing the decoupling filter have tended to employ an iterative process, by which a filter design is assessed by examining the load transient response of the SMPS of which it forms a part, and modifying the configuration of the filter—essentially by trial and error—for assessment in the next iteration of the process. However, this approach is time-consuming and usually results in a sub-optimal configuration of the decoupling filter.

SUMMARY

In view of the shortcomings of conventional approaches to determining a configuration of capacitors in a decoupling filter of a SMPS, the present inventors have devised a scheme of determining a configuration of decoupling filter capacitors that allows an optimal or near-optimal capacitor configuration to be found efficiently, in a systematic way, by searching through a set of candidate capacitor configurations, with the search being guided by the requirement to fulfil a load transient response requirement of the SMPS and to minimise the value of a cost function. As will be explained in the following, the inventors have devised a technique that minimises a cost function whilst ensuring that a load transient requirement is fulfilled, and allows an appropriate number of capacitors of each kind to be selected for a defined output filter structure.

More particularly, the inventors have devised a method of determining a configuration of capacitors in an output filter of a SMPS. The method comprises generating candidate configurations of capacitors defining respective arrangements of capacitors of different kinds in the output filter, each candidate configuration being associated with a respective value of a cost function that is calculated based on a number of capacitors of each kind in the candidate configuration and a cost assigned to each kind of capacitor, wherein the candidate configurations are ordered in order of increasing or decreasing values of the cost function. The method further comprises performing a binary search on the ordered candidate configurations of capacitors to determine a capacitor configuration associated with a lowest value of the cost function from among candidate configurations of capacitors that are determined during the binary search to allow a load transient response requirement of the SMPS to be fulfilled. Whether or not a candidate configuration allows the load transient response requirement of the SMPS to be fulfilled is determined using a model of a SMPS having the candidate configuration of the output filter to simulate a deviation of an output voltage of the SMPS in response to a change in a load current of the SMPS, and determining whether the load transient response requirement is fulfilled based on the simulated deviation of the output voltage.

The inventors have further devised a computer program product, comprising a signal or a non-transitory computer-readable storage medium carrying computer program instructions which, when executed by a processor, cause the processor to perform a method as set out above.

The inventors have further devised an apparatus for determining a configuration of capacitors in an output filter of a SMPS. The apparatus comprises a candidate configuration generator module arranged to generate candidate configurations of capacitors defining respective arrangements of capacitors of different kinds in the output filter. The candidate configuration generator module comprises a cost calculation module arranged to evaluate, for each candidate configuration, a cost function based on a number of capacitors of each kind in the candidate configuration and a cost assigned to each kind of capacitor, and also includes an association module arranged to associate each candidate configuration with a respective value of the cost function calculated by the cost calculation module. The candidate configuration generator module is arranged to order the candidate configurations in order of increasing or decreasing values of the cost function. The apparatus further comprises a search module arranged to perform a binary search on the ordered candidate configurations of capacitors to determine a capacitor configuration associated with a lowest value of the cost function from among candidate configurations of capacitors that are determined during the binary search to allow a load transient response requirement of the SMPS to be fulfilled. The search module comprises an output voltage deviation determining module arranged to simulate a deviation of an output voltage of the SMPS in response to a change in a load current of the SMPS, using a model of a SMPS having a candidate configuration of the output filter, and an evaluation module arranged to determine whether the candidate configuration of capacitors allows the load transient response requirement to be fulfilled based on the simulated deviation of the output voltage.

BRIEF DESCRIPTION OF THE DRAWINGS

Embodiments of the invention will now be explained in detail, by way of example only, with reference to the accompanying figures, in which:

FIGS. 19 to 21 are flow diagrams illustrating alternatives to the process shown in FIG. 7.

DETAILED DESCRIPTION OF EMBODIMENTS

Before describing embodiments of the present invention, components of a switched mode power supply that are helpful for explaining the present invention will first be described with reference to FIG. 1.

The SMPS 100 comprises switch circuitry 110 comprising at least one switching element (e.g. MOSFET) that is arranged in the switch circuitry 110 and controlled to switch at a high frequency (e.g. tens to hundreds of kHz) and with a duty cycle so as to convert an input DC voltage $V_{in}$ of the SMPS 100 to an output voltage, which is filtered by a low-pass filter 120 of the SMPS (e.g. a first order LC filter comprising an inductor and one or more capacitors) to generate an output a DC voltage, $V_{out}$, of the SMPS 100. The switch circuitry 110 may include an isolation transformer having a primary winding driven by a primary side circuit, and a secondary winding electromagnetically coupled to the primary winding and arranged to drive a secondary side circuit typically comprising a rectifying network, the one or more switching elements being provided in one or both of the primary and secondary side circuits. Suitable circuit topologies and other details of the switch circuitry 110, as well as details of the output filter 120, are well-known to those skilled in the art and will therefore not be described here.

The SMPS 100 further comprises a feedback loop which is arranged to regulate the output voltage $V_{out}$ of the SMPS 100 in accordance with a control law that is characterised by one or more control law parameters. The feedback loop typically comprises a controller that regulates the switching frequency or the switching duty cycle of the switching element(s) of the SMPS based on the output voltage or output current of the SMPS, in accordance with a control law defined by one or more control law parameters, to keep the output voltage of the SMPS in the vicinity of a predetermined value.

The feedback loop may be implemented digitally and thus include a sample and hold circuit 130 arranged to sample $V_{out}$ or a signal indicative thereof (e.g. at intervals of 1 to 10 microseconds) and temporarily store the sampled values in a buffer, and an analog-to-digital converter (ADC) 140 which is arranged to digitise the stored sample values. Analog implementations of the feedback loop are, of course, also possible.

Figure 1:
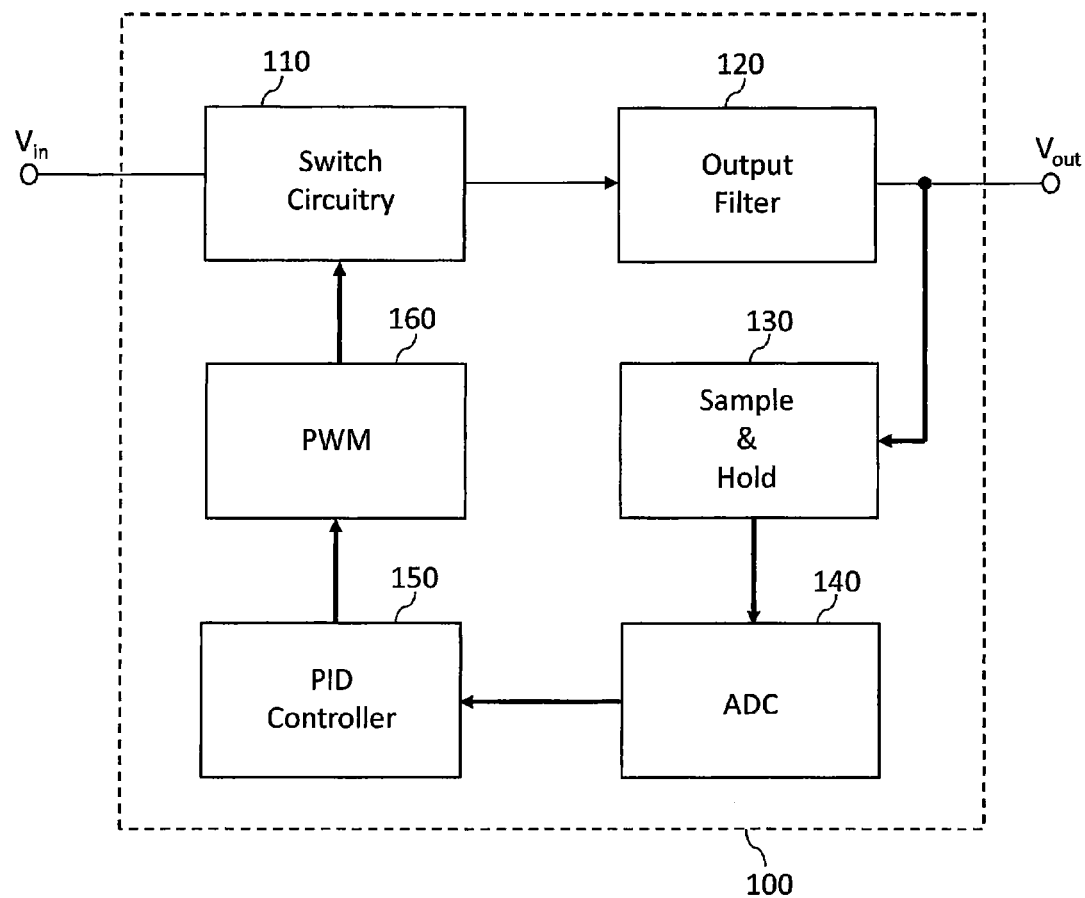
FIG. 1 illustrates functional components of a switched mode power supply that are helpful for understanding the present invention.

As shown in FIG. 1, the feedback loop also includes a feedback controller in the form of a PID regulator (also referred to herein as a PID controller) 150 that regulates the duty cycle (or the switching frequency, as the case may be) of the switching element(s) to keep the output voltage of the SMPS 100 constant, on the basis of received indications of $V_{out}$ (i.e. the sample values from the ADC 140 in the present example) and in accordance with a PID control law that is characterised by the values of the P, I and D control parameters set in the PID regulator 150. However, another kind of regulator, which regulates $V_{out}$ in accordance with a different control law that is defined using a different set of one or more control law parameters, may be used in place of the PID regulator 150. The PID regulator 150 is arranged to generate control signals to control a pulse width modulator (PWM) 160 also included in the feedback loop, to appropriately control the switching of the switching element(s) in the switch circuitry 110. The functionality of the components of the feedback loop illustrated in FIG. 1, and alternative ways of implementing and distributing these components among the primary and secondary sides of the isolation barrier of the SMPS 100 (where one is provided, as in the present example), will be familiar to those skilled in the art, such that it is unnecessary to provide further details here.

[Embodiment 1]

An apparatus for determining a configuration of capacitors in an output filter of a SMPS according to a first embodiment of the present invention will now be described with reference to FIG. 2.

Figure 2:
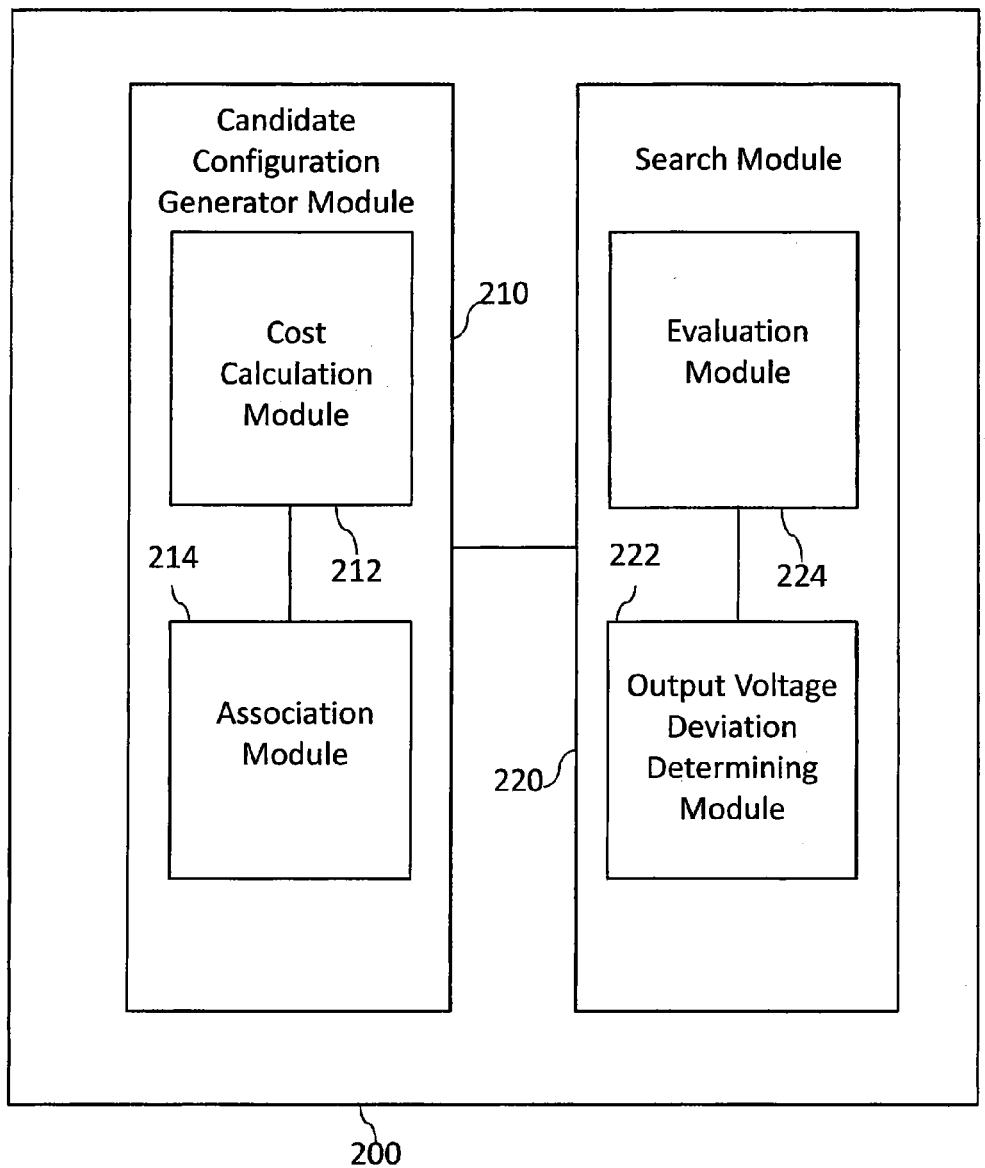
FIG. 2 illustrates functional components of an apparatus for determining a configuration of capacitors in an output filter of a SMPS according to an embodiment of the present invention.

FIG. 2 shows functional components of the apparatus 200 of the present embodiment. The apparatus 200 comprises a candidate configuration generator module 210 comprising a cost calculation module 212 and an association module 214, as well as a search module 220 comprising an output voltage deviation determining module 222 and an evaluation module 224, which are functionally inter-connected as shown.

In brief, the candidate configuration generator module 210 is arranged to generate candidate configurations of capacitors defining respective arrangements of capacitors of different kinds in the output filter 120 of the SMPS 100. The kinds of capacitor used in the SMPS's output filter (also referred to as a decoupling filter) usually differ from one another by at least one of the capacitance, physical size, structure, material composition, electrical performance characteristics (e.g. the equivalent series resistance (ESR), leakage current, and/or temperature dependence of the capacitance), environmental characteristics (e.g. variation of the capacitance with humidity, or exposure to thermal shock or moisture etc.) and mechanical performance characteristics (e.g. variation of the capacitance with an applied stress) of their capacitors, with capacitors of the same kind having nominally the same values of these properties (often specified to within a tolerance).

The cost calculation module 212 is arranged to evaluate, for each candidate configuration, a cost function based on a number of capacitors of each kind in the candidate configuration and a cost assigned to each kind of capacitor, while the association module 214 is arranged to associate each candidate configuration with a respective value of the cost function calculated by the cost calculation module 212. The candidate configuration generator module 210 is arranged to order the candidate configurations in order of increasing or decreasing values of the cost function.

The search module 220 is arranged to perform a binary search on the ordered candidate configurations of capacitors to determine a capacitor configuration associated with a lowest value of the cost function from among candidate configurations of capacitors that are determined during the binary search to allow a load transient response requirement of the SMPS to be fulfilled. The output voltage deviation determining module 222 is arranged to simulate a deviation of $V_{out}$ that would occur in response to a change in a load current of the SMPS 100, using a model of a SMPS having a candidate configuration of the output filter, and the evaluation module 224 is arranged to determine whether the candidate configuration of capacitors allows the load transient response requirement to be fulfilled based on the simulated deviation of the output voltage.

Figure 3:
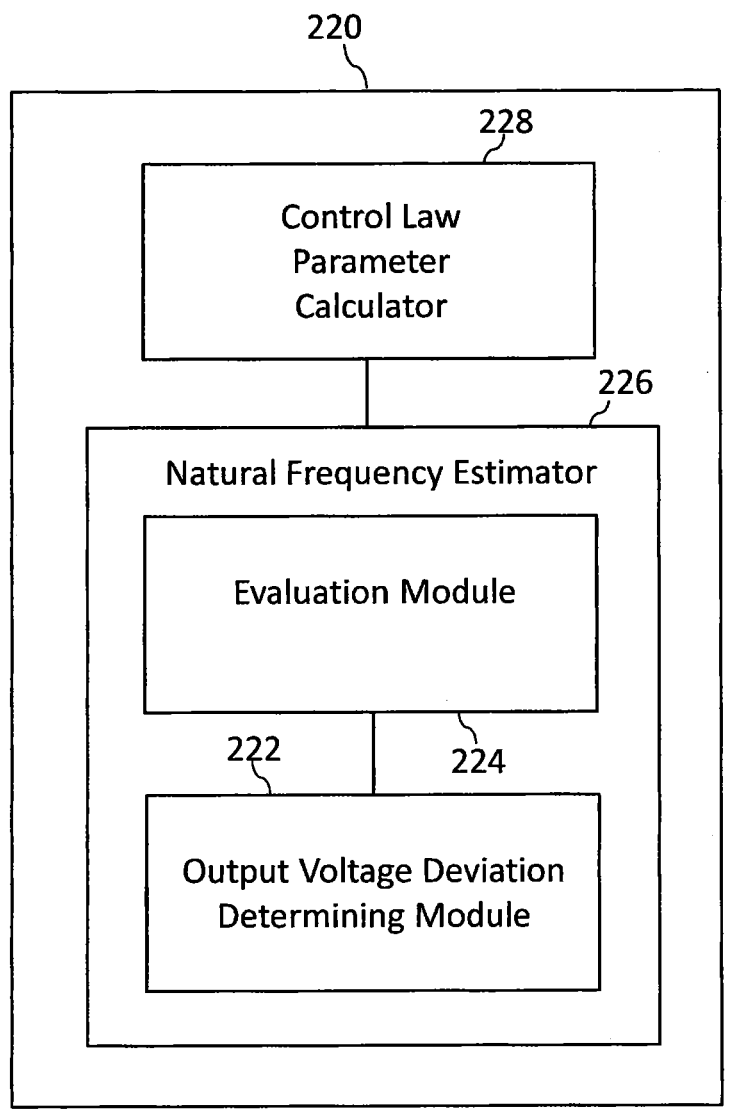
FIG. 3 illustrates functional components of the search module shown in FIG. 2.

The search module 220 may, as in the present embodiment, also include a natural frequency estimator 226 comprising the output voltage deviation determining module 222 and the evaluation module 224, as well as a control law parameter calculator 228, as shown in the more detailed illustration of the search module 220 in FIG. 3.

The functionality of these and other components of the apparatus 200 of the present embodiment will be explained in more detail below.

Figure 4:
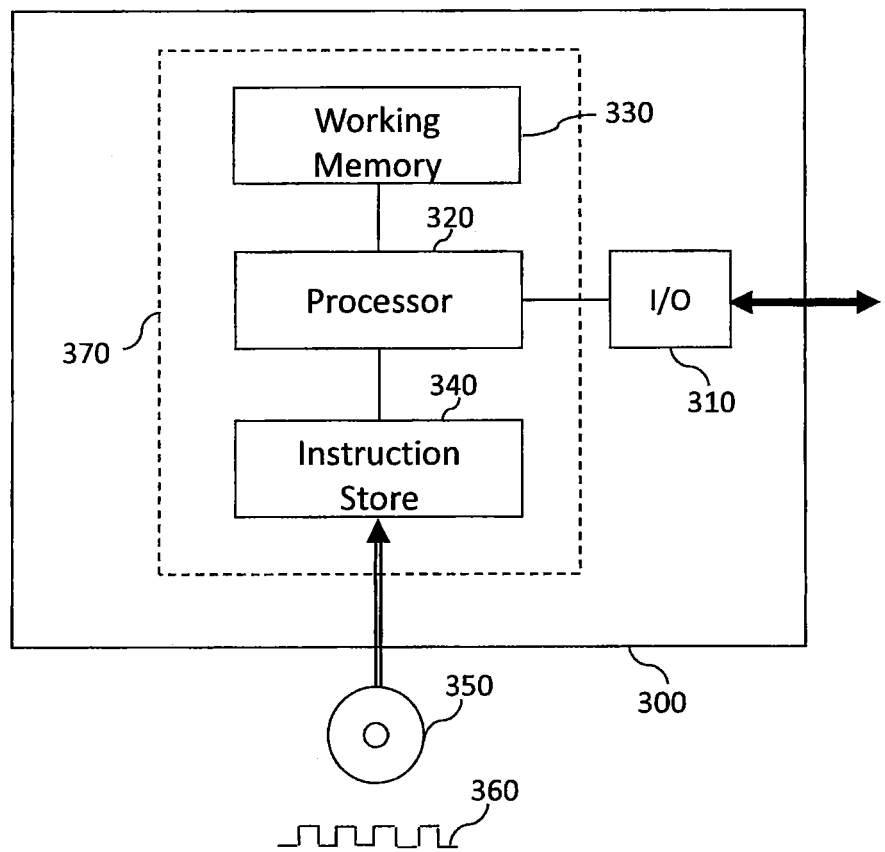
FIG. 4 shows an exemplary hardware implementation of the apparatus shown in FIGS. 2 and 3.

FIG. 4 shows an exemplary implementation of the apparatus 200, in programmable signal processing hardware. The signal processing apparatus 300 shown in FIG. 4 comprises an input/output (I/O) section 310 that functions as an interface module of the apparatus 200 for receiving data on the basis of which the apparatus 200 determines the required capacitor configuration (including specifications of output filter type, definitions of capacitor types and associated costs, parameters defining load transient forms and load transient requirements used in the algorithms, etc.), and outputting an indication of the determined capacitor configuration, and optionally one or more calculated control parameter values, to the user (e.g. via a visual display unit (VDU) such an a LED monitor).

The signal processing apparatus 300 further comprises a processor 320, a working memory 330 and an instruction store 340 storing computer-readable instructions which, when executed by the processor 320, cause the processor 320 to perform the processing operations hereinafter described to determine a configuration of capacitors in the output filter 120 of the SMPS 100. The instruction store 340 may comprise a ROM which is pre-loaded with the computer-readable instructions. Alternatively, the instruction store 340 may comprise a RAM or similar type of memory, and the computer readable instructions can be input thereto from a computer program product, such as a computer-readable storage medium 350 such as a CD-ROM, etc. or a computer-readable signal 360 carrying the computer-readable instructions.

In the present embodiment, the combination 370 of the hardware components shown in FIG. 3, comprising the processor 320, the working memory 330 and the instruction store 340, is configured to implement the functionality of the components of the apparatus 200 that have been described above with reference to FIGS. 2 and 3. The functionality of the candidate configuration generator module 210 and the search module 220 will now be described in further detail with reference to the remaining Figures.

Figure 5:
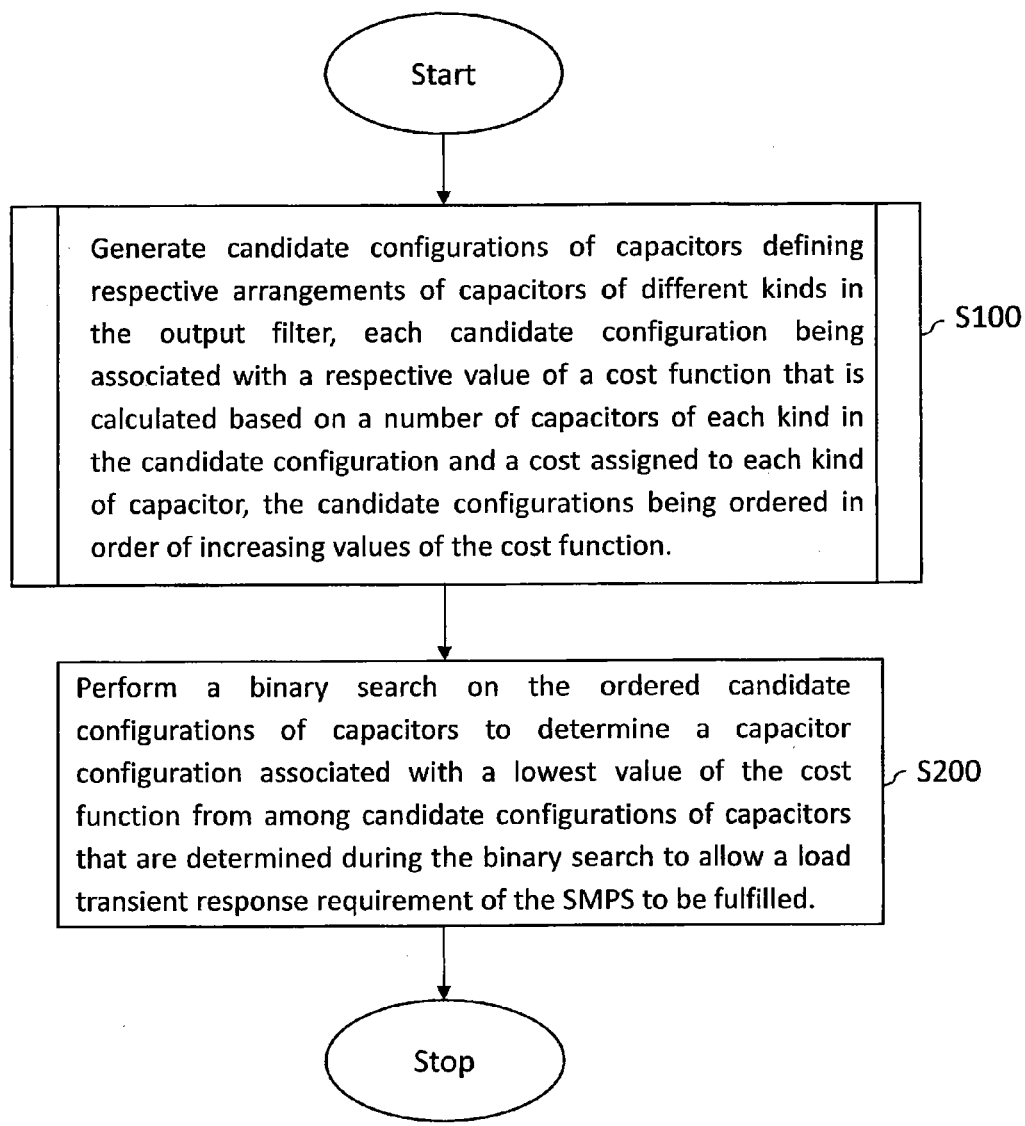
FIG. 5 is a flow diagram illustrating a method of determining a configuration of capacitors in an output filter of a SMPS according to an embodiment of the present invention.

FIG. 5 is a flow diagram which provides a top-level illustration of the process by which a configuration of capacitors in the output filter 120 of the SMPS 100 is determined.

In step S100, the candidate configuration generator module 210 generates candidate configurations of capacitors defining respective arrangements of capacitors of different kinds in the output filter 120, and each candidate configuration is associated by the association module 214 with a respective value of a cost function that is calculated by the cost calculation module 212 on the basis of a number of capacitors of each kind in the candidate configuration and a cost assigned to each kind of capacitor. In the present embodiment, the candidate configuration generator module 210 orders the candidate configurations in order of increasing values of the cost function. However, in an alternative embodiment, the candidate configurations may instead be ordered in order of decreasing values of the cost function. Further details of these processes will be described with reference to FIG. 6.

In step S200 of FIG. 5, the search module performs a binary search on the ordered candidate configurations of capacitors to determine a capacitor configuration associated with a lowest value of the cost function from among candidate configurations of capacitors that are determined during the binary search to allow a load transient response requirement of the SMPS 100 to be fulfilled. Whether or not a candidate configuration is expected to allow the load transient response requirement of the SMPS 100 to be fulfilled is determined by the output voltage deviation determination module 222 simulating a deviation of $V_{out}$ that occurs in response to a change in a load current of the SMPS 100, by using a model of a SMPS having the candidate configuration of the output filter 120, and by the evaluation module 224 determining whether the load transient response requirement is fulfilled based on the simulated deviation of $V_{out}$.

Figure 6:
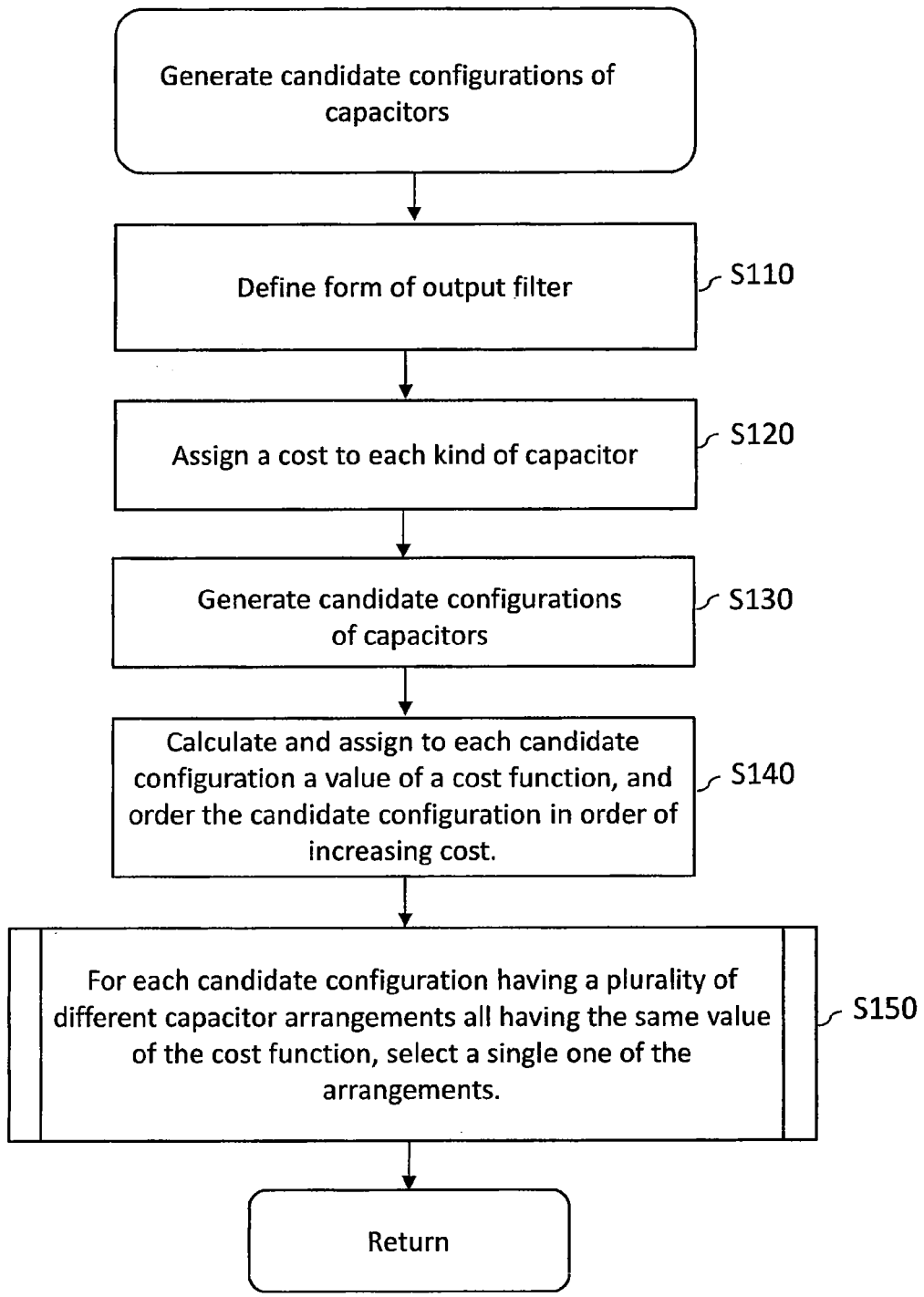
FIG. 6 is a flow diagram showing further details of the process of generating candidate configurations of capacitors illustrated in FIG. 5.

FIG. 6 is a flow diagram which shows, by way of example, how the processes in step S100 may be performed.

Firstly, in step S110 of FIG. 6, the candidate configuration generator module 210 defines the form of the output filter that is assumed in the subsequent calculations in terms of a filter type of the output filter, and the different kinds of capacitor that may appear in candidate configurations of the output filter. For example, in the present embodiment, the filter type is C-L-C low-pass filter. More particularly, in this embodiment, two kinds of capacitor are connected in parallel between the output of the switch circuitry 110 shown in FIG. 1 and Ground (giving the first capacitance C in the C-L-C filter), with the output of the switch circuitry 110 then being connected via an inductor L to another parallel combination of two kinds of capacitor that are similarly connected to Ground (and provide the second capacitance C in the C-L-C filter). Thus, between the output filter's inductor L and the switch circuitry 110, a number (including zero), $N_{MC1}$, of capacitors of a first kind, hereafter referred to as "Module Capacitor 1" (MC1), and a number (again, including zero), $N_{MC2}$, of capacitors of a second kind, hereafter referred to as "Module Capacitor 2" (MC2), are connected between the output rail of the SMPS 100 and Ground. Similarly, between the output filter's inductor L and the output terminal (at $V_{out}$) of the SMPS 100, a number (including zero), $N_{LC1}$, of capacitors of a third kind, hereafter referred to as "Load Capacitor 1" (LC1), and a number (including zero), $N_{LC2}$, of capacitors of a fourth kind, hereafter referred to as "Load Capacitor 2" (LC2), are connected between the output rail of the SMPS 100 and Ground.

Table 1 below shows example component values of these capacitors, together with the associated parasitic resistances R and tolerance values, which may be used to calculate the robustness of the solution found using the algorithm described herein.

TABLE 1

| Name | Size | R (mΩ) | Tolerance (%) |
| --- | --- | --- | --- |
| Module Capacitor 1 | 1000 μF | 10 | 20 |
| Module Capacitor 2 | 100 μF | 5 | 20 |
| Inductor | 10 nH | 5 | 20 |
| Load Capacitor 1 | 470 μF | 5 | 20 |
| Load Capacitor 2 | 47 μF | 5 | 20 |

The form of the output filter may be defined in this way in Step S110 by the candidate configuration generator module 210 making a corresponding selection from a set of possible forms of filter, on the basis of a user input received via the interface module of the apparatus 200, for example.

In step S120, the candidate configuration generator module 210 assigns a cost to each of the kinds of capacitor. The cost may be any unit provided that the relation between the capacitor kinds is maintained. For example, if Module Capacitor 1 is twice as expensive as Module Capacitor 2, and Module Capacitor 1 is assigned a cost of 100, then Module Capacitor 2 should be assigned a cost of 50. An example of an assignment of costs made by the candidate configuration generator module 210 in step S120 is shown in Table 2 below.

TABLE 2

| Name | Cost per capacitor |
| --- | --- |
| Module Capacitor 1 | 100 |
| Module Capacitor 2 | 20 |
| Load Capacitor 1 | 45 |
| Load Capacitor 2 | 10 |

The cost assigned to each kind of capacitor may be indicative of a price or a physical size of the kind of capacitor, or any other figure that is important in the design. The cost may alternatively be indicative of a weighted sum of two or more such figures, e.g. a weighted sum of the price and the physical size of the kind of capacitor. Thus, the cost may be defined as follows:

$$\text{Cost} = \frac{price}{scale1} + \frac{area}{scale2}$$

In the expression for the cost above, the scaling factors "scale1" and "scale 2" are necessary to ensure that the capacitor price and area (i.e. footprint on the circuit board) influence the total cost as equally as possible.

In step S130, the candidate configuration generator module 210 generates candidate configurations of capacitors that define respective arrangements of capacitors of the above-mentioned different kinds in the output filter. More particularly, the candidate configuration generator module 210 generates permutations of sets of capacitors, with the numbers of capacitors of the different kinds varying among the sets, to generate permutations of each possible total cost of the capacitors, starting from a lowest possible cost continuing up to a maximum permitted total cost, which is specified by the user. As will be appreciated from the following, the maximum total cost specified by the user may provide an indication that the load transient requirement hereafter described is too stringent, or that the specified maximum total cost is too small to allow satisfactory load transient performance. In the present embodiment, the maximum total cost of the capacitors is set at 1000 units.

The candidate configuration generator module 210 thus generates the candidate capacitor configurations, subject to the further restriction imposed by the output filter type defined in step S110, namely that the minimum number of capacitors on each side of the inductor L is one. It follows that, in the present embodiment, the total cost can be as low as 30 (using a single "Module Capacitor 1" one side of the inductor L, and a single "Load Capacitor 2" on the other side of the inductor L). The candidate configurations generated by the candidate configuration generator module 210 may be represented in the tabular form, as shown in Table 3 below.

TABLE 3

| Permutation | Number of | | | | Total Cost |
| --- | --- | --- | --- | --- | --- |
| | MC1 | MC2 | LC1 | LC2 | |
| 1 | 0 | 1 | 0 | 1 | 30 |
| 2 | 0 | 1 | 0 | 2 | 40 |
| 3.1 | 0 | 1 | 0 | 3 | 50 |
| 3.2 | 0 | 2 | 0 | 1 | |
| — | — | — | — | — | — |
| — | — | — | — | — | — |
| — | — | — | — | — | — |
| 192.1 | 0 | 1 | 0 | 98 | 1000 |
| 192.2 | 0 | 1 | 2 | 89 | |
| — | — | — | — | — | |
| 192.957 | 4 | 5 | 10 | 5 | |
| — | — | — | — | — | |
| 192.1240 | 9 | 4 | 0 | 2 | |

The cost calculation module 212 calculates the cost for each candidate configuration of capacitors using a cost function that gives the configuration cost as a function of the number of capacitors of each kind in the candidate configuration and the cost assigned to each kind of capacitor. Thus, in the case of the candidate configuration identified as "Permutation 2" in Table 3, the cost function of the present embodiment, which sums the costs of the capacitors in the permutation, yields a cost of (1×20)+(2×10)=40 units.

This process is repeated for all of the permutations, giving 192 different costs. As shown in Table 3, the candidate configurations are ordered by the candidate configuration generator module 210 in order of increasing values of the cost function, from 30 units to 1000 units. Some of the candidate configurations have a single arrangement of capacitors of different kinds in the output filter 120, while others have a plurality of arrangements of capacitors of different kinds, all having the same value of the cost function. For example, in the case of candidate configuration 192 shown in Table 3, there are 1240 different arrangements of capacitors of the different kinds, all yielding the same value of the cost function, namely the maximum value of 1000 units.

Where a candidate configuration comprises a plurality of different arrangements of capacitors of different kinds in the output filter 120, with all of the different arrangements being associated with the same value of the cost function, the candidate configuration generator module 210 preferably selects one of these arrangements. This selection may be performed in one of a number of different ways.

Figure 7:
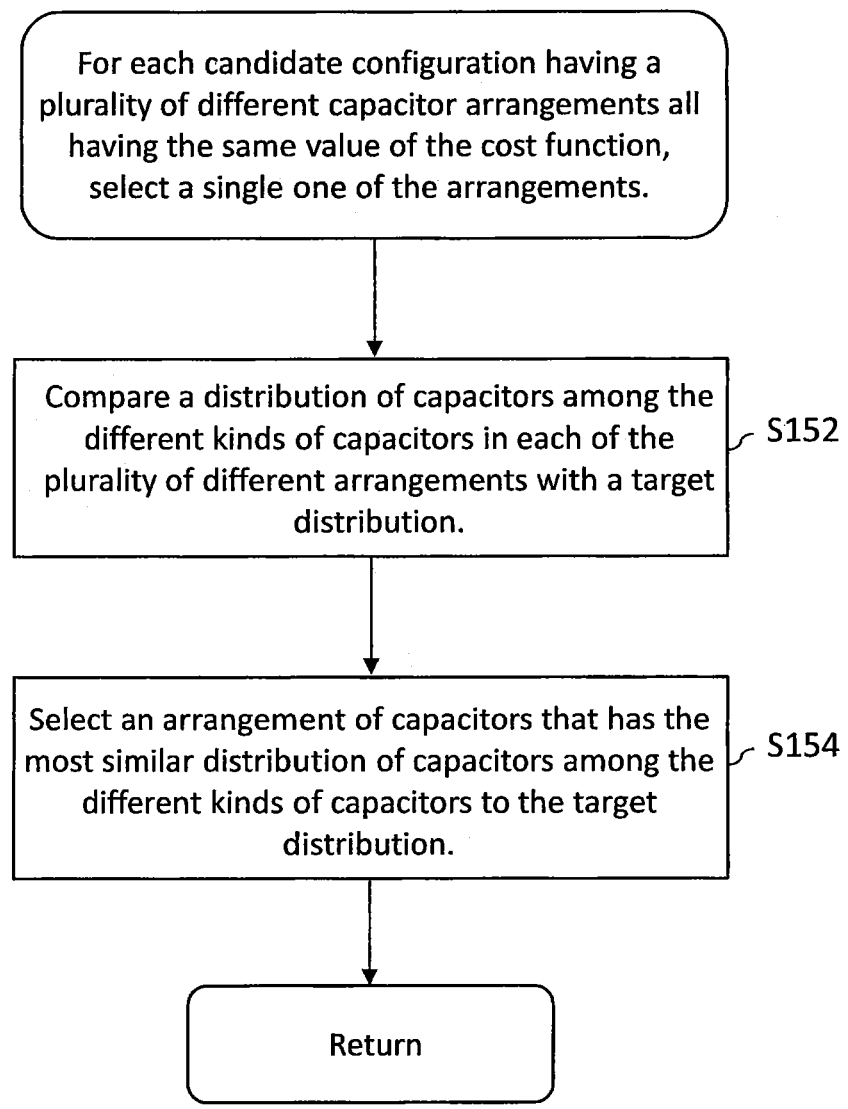
FIG. 7 is a flow diagram showing how a candidate capacitor configuration is selected from a plurality of candidate configurations all having the same value of the cost function in the embodiment.

In the present embodiment, the candidate configuration generator module 210 selects and retains, in step S150 of FIG. 6, for each such candidate configuration having multiple arrangements of capacitors, a single arrangement of capacitors by the process illustrated in the flow diagram of FIG. 7.

In step S152 of FIG. 7, the candidate configuration generator module 210 compares a distribution of capacitors among the different kinds of capacitors in each of the plurality of different arrangements with a target distribution.

The target distribution indicates a preferred way of distributing capacitors among the different capacitor types, and may be regarded as a histogram giving the preferred proportions (e.g. expressed as a percentage) of capacitors of the different kinds in the output filter 120. Thus, the most common kind of capacitor to appear in the preferred distribution will have the highest percentage value. Similarly, if there are preferably equal numbers of capacitors of the different kinds in the output filter, the target distribution will be flat, with the different kinds of capacitor having the same percentage value. Such an arrangement can be used to obtain a low impedance in the output filter at all frequencies. As an example, in the present embodiment, the target distribution is illustrated in Table 4 below.

TABLE 4

| Name | Target proportion [%] |
| --- | --- |
| Module Capacitor 1 | 20 |
| Module Capacitor 2 | 20 |
| Load Capacitor 1 | 40 |
| Load Capacitor 2 | 20 |

In step S154 of FIG. 7, the candidate configuration generator module 210 selects an arrangement of capacitors that has the most similar distribution of capacitors among the different kinds of capacitors to the target distribution. The selected arrangement is retained for further processing, while the remaining arrangements are discarded. For this comparison, the candidate distribution should be normalised (or the target distribution should have the same number of capacitors as there are in the permutation being considered).

For example, in the case of candidate configuration 192 shown in Table 3, the candidate configuration generator module 210 selects a single arrangement of capacitors by comparing a distribution of capacitors among the different kinds of capacitors in each of the 1240 permutations with the target distribution illustrated in Table 4, and selects the permutation that has the most similar distribution of capacitors among the different kinds of capacitors to the target distribution, namely arrangement 957. This selection process is performed for each candidate configuration having a plurality of different arrangements of capacitors of different kinds, all associated with the same value of the cost function. The similarity between the distribution of capacitors in an arrangement and the target distribution may be determined in any suitable way known to the skilled person, for example by calculating a measure of the correlation between the two distributions (e.g. the Pearson product-moment coefficient of correlation), and selecting the arrangement whose distribution has the highest correlation with the target distribution.

The result of the above-described processes that are performed in step S100 of FIG. 5 is shown in Table 5 below.

TABLE 5

| Permutation | Number of | | | | Cost |
| --- | --- | --- | --- | --- | --- |
| | MC1 | MC2 | LC1 | LC2 | |
| 1 | 0 | 1 | 0 | 1 | 30 |
| 2 | 0 | 1 | 0 | 2 | 40 |
| 3.2 | 0 | 2 | 0 | 1 | 50 |
| — | — | — | — | — | — |
| — | — | — | — | — | — |
| 192.957 | 4 | 5 | 10 | 5 | 1000 |

Referring again to FIG. 5, further details of the processes performed in step S200 will now be described.

As explained above, the search module 220 searches the ordered set of candidate configurations of capacitors (as illustrated in Table 5) to determine a capacitor configuration associated with a lowest value of the cost function from among candidate configurations of capacitors that are determined during the search to allow a load transient response requirement of the SMPS 100 to be fulfilled.

Figure 8:
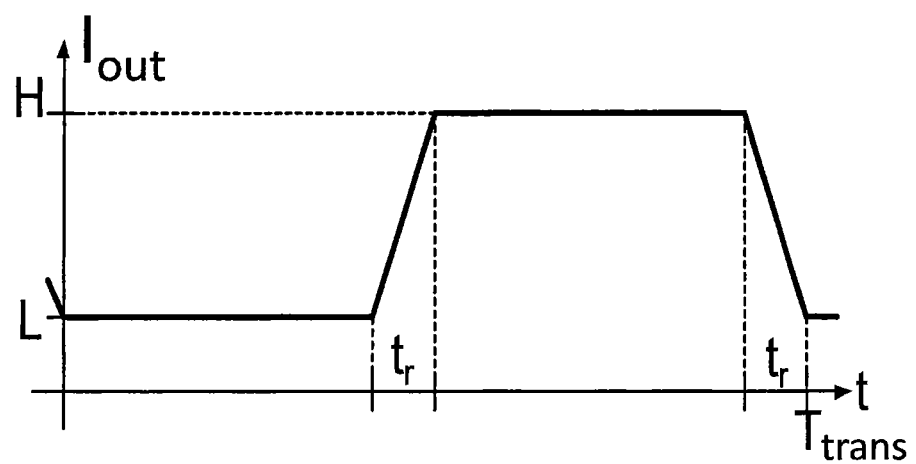
FIG. 8 schematically illustrates the form of a load current transient used in a simulation of the response of the SMPS described herein.

A load transient is a variation in the load current of the SMPS 100, and may take the form illustrated in FIG. 8, which is assumed in the processes described herein below. As shown in FIG. 8, the load current increases from a low level, L, to a high level, H, over a period of time $t_r$, giving a slew rate of $(H-L)/t_r$ (typically 1-30 A/microsecond). The L and H output current levels usually correspond to 25 percent and 75 percent of the SMPS's current output ability, respectively. The switch period $T_{trans}$ is chosen so that the output voltage has enough time to completely recover after a transient (a L-H or H-L transition) before the next transient. Suitable values for $T_{trans}$ are in the range of 2-3 ms.

Figure 9:
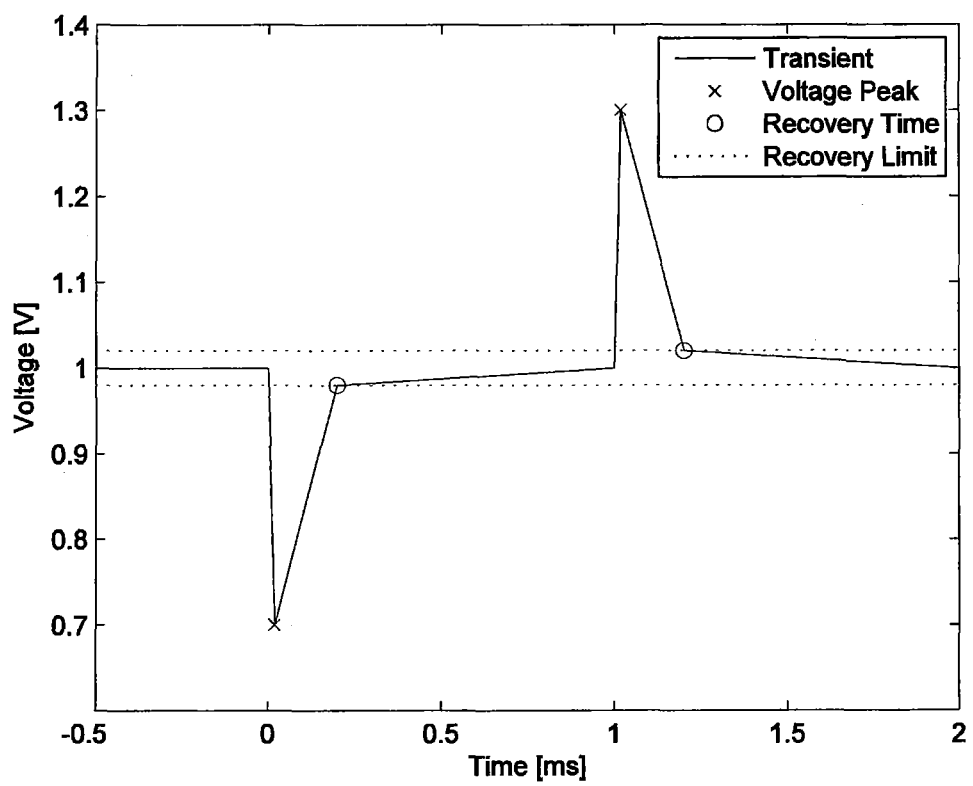
FIG. 9 illustrates a variation of the output voltage of the SMPS in response to a load current transient, in which the peak voltage and the recovery time take the maximum values specified by the user.

Following such a load transient, $V_{out}$ may deviate from an initial value (at which it was the load transient occurred) to a maximum or minimum value, before decaying back towards its initial value, as illustrated in FIG. 9. The recovery time is the time required for $V_{out}$ to return to within a tolerance band (or "recovery limit") of output voltage values (e.g. centred on the initial value of $V_{out}$, before the load transient occurs), following the variation in the load current of the SMPS 100. The boundaries of the tolerance band usually lie a few percent (normally 1-3 percent) above and below the initial output voltage value, and the recovery time corresponds to the time taken by the output voltage to reach either of these boundaries following the occurrence of a load transient.

The load transient response requirement is dependent on a maximum output voltage deviation, and a maximum recovery time, that are permitted following the occurrence of a load transient. Once these limits have been specified, the load transient response requirement may be quantified using a goal function G that provides a measure of at least one of the maximum SMPS output voltage deviation (e.g. the voltage overshoot observed) during the variation in the load current, and the recovery time. More specifically, the load transient response requirement (LTRR) is obtained by evaluating the goal function G for the specified maximum output voltage deviation and maximum recovery time. One possible form for the goal function G, which is discussed further below, is as follows:

$$[\int_0^{T_{trans}} |V_{out}(t) - V_{DC}|^N dt]^{1/N},$$

where $V_{DC}$ denotes a DC voltage from which $V_{out}$ deviates in response to the variation in the load current of the SMPS, and N is an integer greater than or equal to 1.

Figure 10:
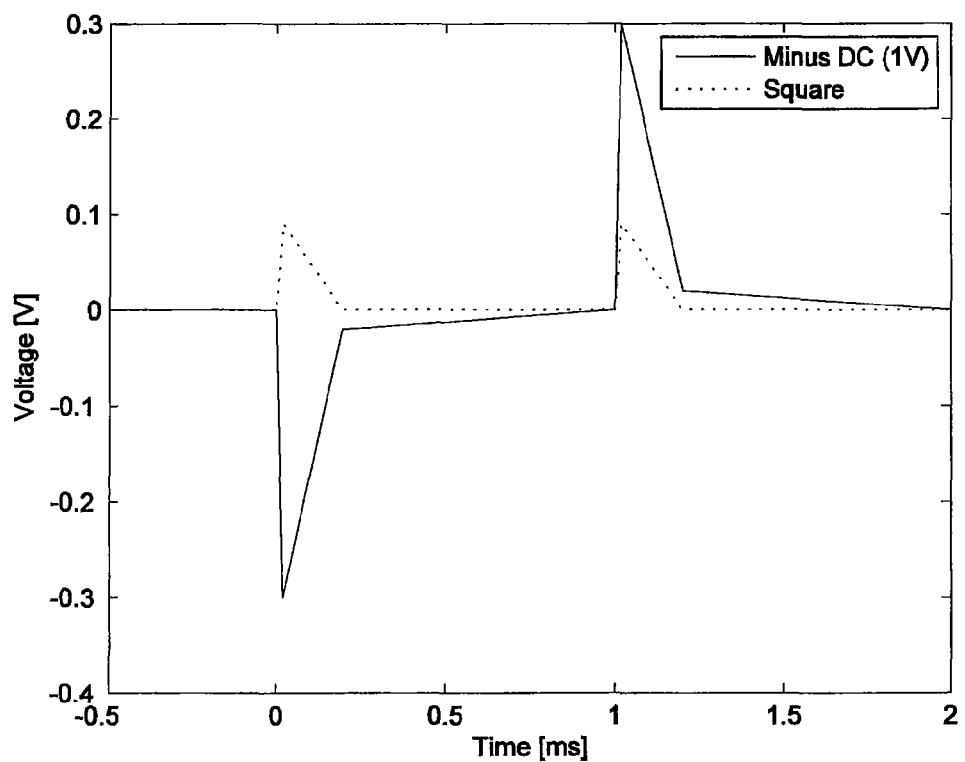
FIG. 10 illustrates the variation of the output voltage in FIG. 9 after subtraction of the DC voltage level.

The search module 220 processes $V_{out}(t)$ as illustrated in FIG. 9, which corresponds to the "worst case" variation that has been specified by the user, by removing the DC level, $V_{DC}$, of the signal (about 1 V in this example) and evaluating the goal function G based on the resulting signal, i.e. $V_{out}(t)-V_{DC}$, as illustrated in FIG. 10, to determine the load transient response requirement of the SMPS.

The capacitor configuration that has the lowest value of the cost function whilst fulfilling the load transient response requirement is found in a highly efficient way, using a binary search process that is described concisely by the following pseudo-code, where "permutations[i]" represents the i-th capacitor configuration in the ordered set of capacitor configurations generated in step S100 of FIG. 5, and "Permutations.Length" represents the number of candidate configurations that have been generated at the conclusion of step S100 (i.e. 192 in the present embodiment).

```
LTRR      <- Calculate the LTRR
i_min ← 0
```

```
i_max ← Permutations.Length - 1
while(i_max <= i_min)
            i ← i_min + (i_max - i_min)/2
            r ← Sim(permutations[i])
            if (r <= LTRR)
                i_max ← i - 1
            else
                i_min ← i + 1
            end
end
return permutations[i]
```

In the pseudo-code above, Sim( ) denotes a process by which the goal function G is evaluated for a candidate configuration of output filter capacitors to determine whether the candidate configuration allows the load transient response requirement of the SMPS to be fulfilled. Sim( ) may be any process in which a deviation of $V_{out}$, which occurs in response to a change in the load current of the SMPS, is simulated using a model of a SMPS having the candidate configuration of the output filter. However, a particularly advantageous implementation of this process, which additionally determines optimal (or near-optimal) values of control law parameters for tuning the feedback loop of the SMPS 100, is described below.

When designing a digital compensation loop for a SMPS, standard design tools that consider the design in the frequency domain have conventionally been used, which can provide useful indications of system stability or robustness for plant changes and modelling errors. In this case, loop compensation is typically designed using rules of thumb for placing the PID compensation zeros, normally at the pole's natural frequency and one octave below. However, this approach usually requires the designer to have a good understanding of the system at hand, and in many cases yields sub-optimal solutions. Other conventional approaches are based essentially on trial and error, which can be very time-consuming.

The present inventors have conceived a scheme of efficiently determining values of control law parameters for tuning the feedback loop of a SMPS that can optimise load transient performance for any given output filter configuration. As will be explained in the following, the parameter determination algorithms devised by the inventors employ new goal functions which can be configured to emphasise different objectives in the optimisation. This contrasts with conventional approaches, where load transient behaviour is usually considered when designing the control loop only to the extent that the well-known result, that a phase margin of 60 degrees yields a well-behaved load transient, is used.

Figure 11:
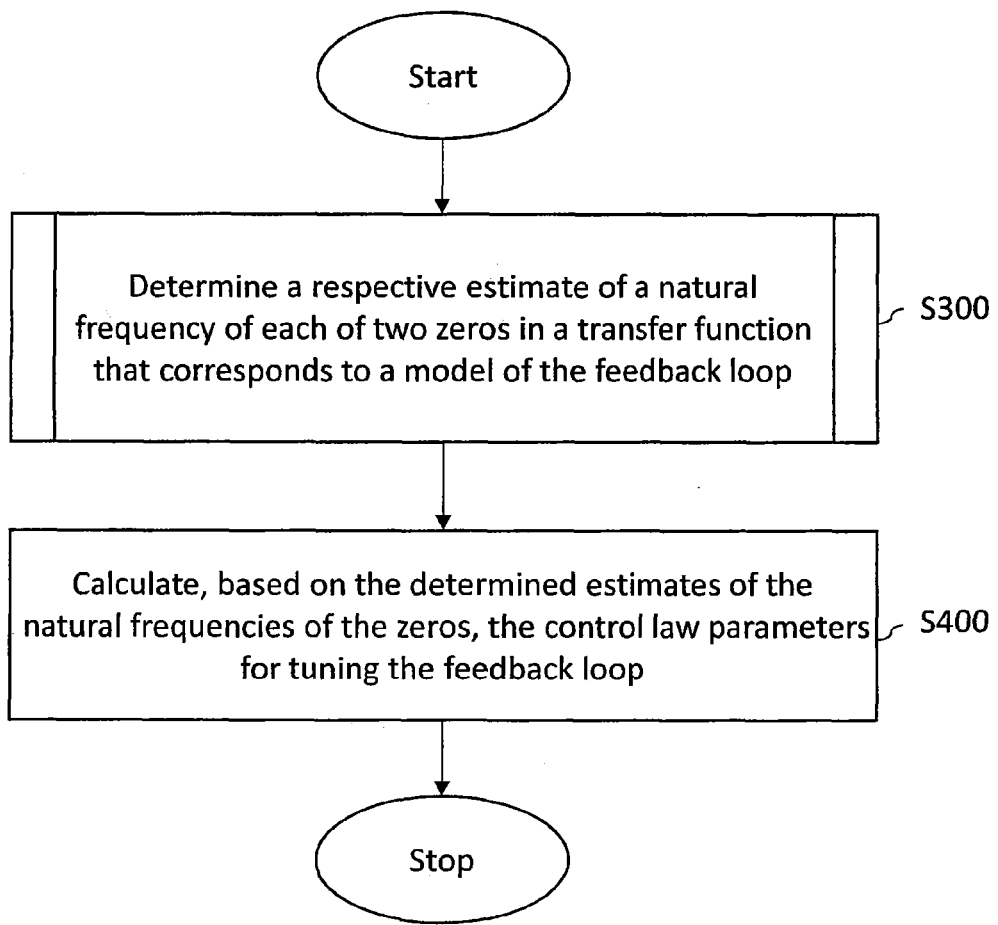
FIG. 11 is a flow diagram illustrating a method of determining control law parameters for tuning the feedback loop of a SMPS, wherein a value of a goal function, G, is determined for a candidate configuration of capacitors in the output filter of the SMPS.
Figure 12:
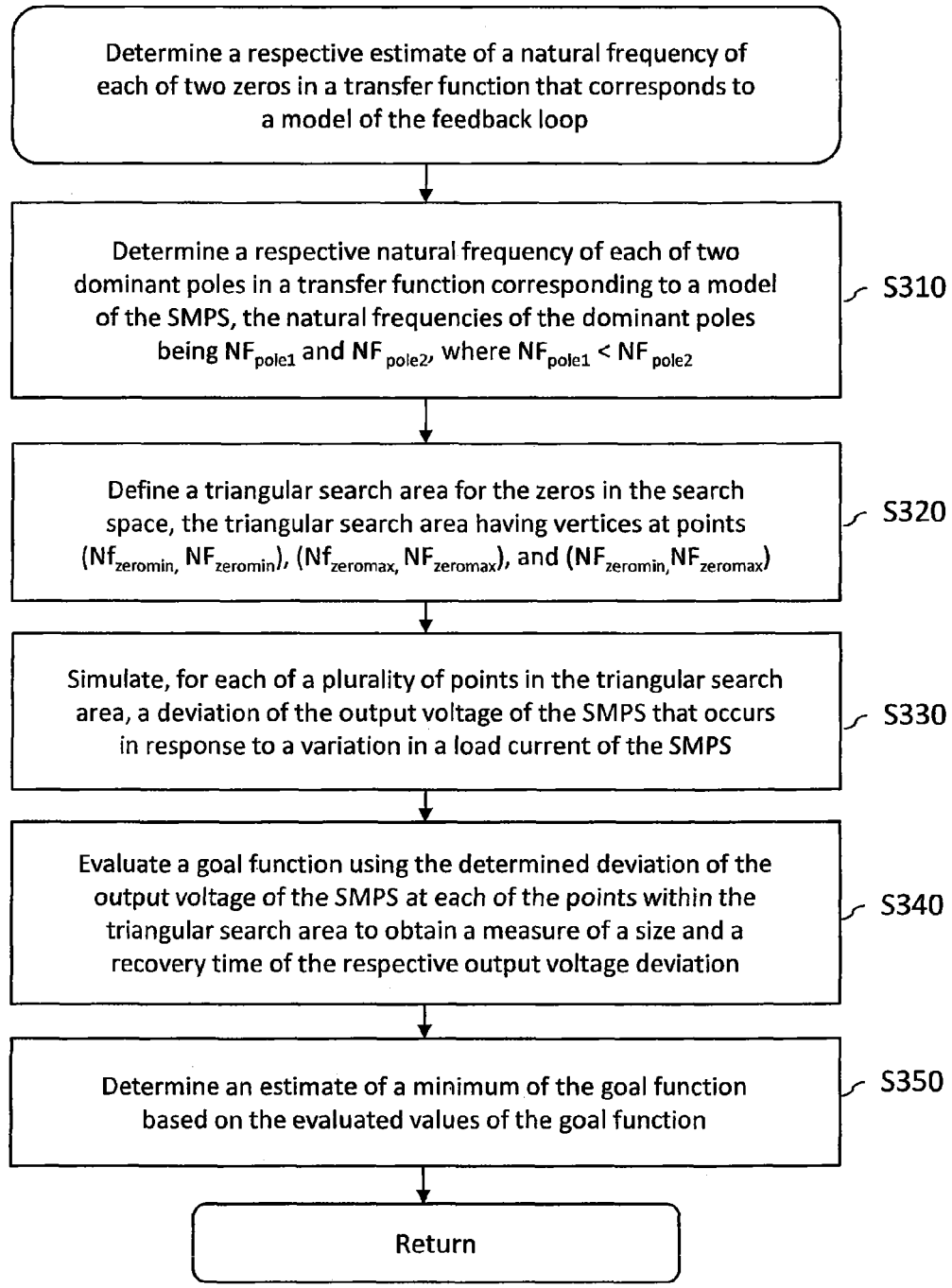
FIG. 12 is a flow diagram showing further details of the process in step S300 of FIG. 11.

FIGS. 11 and 12 are flow charts illustrating a process by which the feedback loop tuning apparatus 200 evaluates the goal function G for a candidate configuration of capacitors and determines values of control law parameters for tuning the feedback loop of the SMPS 100 in the present embodiment.

FIG. 11 provides a top-level illustration of this process. In step S300 of FIG. 11, the natural frequency estimator 226 determines a respective estimate of a natural frequency of each of two zeros in a transfer function associated with a mathematical model of the feedback loop of the SMPS 100. In the present embodiment, the feedback loop is modelled to implement PID control law, which widely used in industry. However, it will be appreciated that the techniques described herein are applicable to other kinds of control law.

A digital implementation of PID control may employ a second order direct-form I (DF-I) section, which implements the following transfer function:

$$PID(z) = G \frac{(z - z_{zero1})(z - z_{zero2})}{z - 1},$$

where the two zeros realise the D-part, and the integrator I is implemented with a pole at +1 in the z-plane. The gain level is set by the factor G. In the present embodiment, the transfer function thus has two compensation zeros that should be placed properly since they affect the load transient behaviour, while the gain factor G so that the open loop system reaches design robustness goals in terms of phase and gain margins.

It should be noted that, if the model of the SMPS is of a higher order than two, a model reduction technique, such as Balanced model reduction, which uses Hankel singular values, is preferably used to reduce the order to two. However, any other suitable model reduction technique may alternatively be used.

In brief, in step S300, the natural frequency estimator 226 determines, for each of a plurality of points in a search space, wherein the coordinates of each of the points correspond to candidate values of the natural frequencies of the zeros, a deviation of the output voltage $V_{out}$ of the SMPS 100 from an initial value that occurs in response to a variation in a load current of the SMPS 100. The natural frequency estimator 226 then evaluates a novel goal function G devised by the present inventors at each of the plurality of points, using the determined deviation of $V_{out}$, wherein the evaluated goal function G provides a measure of at least one of a size and a recovery time of the respective output voltage variation. Based on the evaluated values of the goal function G, the natural frequency estimator 226 then estimates the location of a minimum of the goal function G in the search space using any suitable algorithm known to the skilled person (e.g. the steepest descent method, Newton's method using Jacobean matrix of gradient, conjugated gradient method, Broyden-Fletcher-Goldfarb-Shannon (BFGD) method etc.). The location of the goal function minimum corresponds to the natural frequencies of the zeros. Examples of suitable goal functions and further details of the processes summarised above, as well as a particularly efficient search algorithm which has been devised by the present inventors, will be described below.

In step S400, the control law parameter calculator 228 calculates, based on the estimates of the natural frequencies of the zeros determined by the natural frequency estimator 226, the control law parameters for tuning the feedback loop.

The procedure by which the natural frequency estimator 226 determines, for each candidate configuration of capacitors, the value of the goal function G (assigned to variable "r" in the pseudo-code) and estimates of the natural frequency of each of two zeros in the transfer function of the feedback loop will now be described in more detail with reference to FIG. 12.

The zeros' phase lead compensates for the phase lag from the poles of a transfer function derived from a model of the SMPS (described further below). Hence, important input data for the optimisation process described herein are the natural frequencies for the SMPS poles, as these limit the search range for the zeros' natural frequencies, as will be described further below. To a good approximation, the zero's phase lead starts one decade below its natural frequency, and yields its maximum one decade above. Thus, a larger range than that is normally unnecessary to investigate. Experiments conducted by the inventors have shown that the search range can be further limited to +/−1 octave around the poles' natural frequencies in the SMPS.

Thus, in step S310, the natural frequency estimator 226 preferably determines a respective natural frequency of each of two dominant poles in a transfer function corresponding to a model of the SMPS that includes the candidate capacitor configuration, the natural frequencies of the dominant poles being $NF_{pole1}$ and $NF_{pole2}$, where $NF_{pole1} \leq NF_{pole2}$. This may be achieved by building a mathematical model of the SMPS 100 including the decoupling filter 120, using techniques and software tools well-known to those skilled in the art. A piece-wise linear model is preferably used, which comprises one linear model for each switching phase of operation of the SMPS. As an example, for a buck converter working in continuous conduction mode (CCM), two different models are sufficient, one corresponding to the case when the switching element is conducting, and the other when the sync/rectification switching element is conducting. The piece-wise linear model is time-averaged in order to obtain a linear model that can be transformed into the frequency domain, so that the dominating pole frequencies can be obtained from that model.

Where step S310 has been performed, the natural frequency estimator 226 preferably defines in step S320 a triangular search area for the zeros in a search space which, as noted above, can be regarded as a two-dimensional space wherein the coordinates $(NF_{zero1}, NF_{zero2})$ of each point correspond to a pair of candidate values, namely $NF_{zero1}$ and $NF_{zero1}$, that the natural frequencies of the zeros may take. The triangular search area has vertices at points $(NF_{zeromin}, NF_{zeromin})$ $(NF_{zeromax}, NF_{zeromax}$ and either $(NF_{zeromin}, NF_{zeromax})$ or $(NF_{zeromax}, NF_{zeromin})$, where $NF_{zeromin} = NF_{pole1}/r_{min}$ and $NF_{zeromax} = NF_{pole2} \cdot r_{max}$. In these expressions, $r_{min}$ and $r_{max}$ are range factors and are each preferably between 1.5 and 3. Moreover, the inventors have found that setting $r_{min} = r_{max} = 2$, so as to search one octave above and one octave below the natural frequencies of the poles, allows good estimates for the zeros' natural frequencies to the found efficiently. Simulations of many common and extreme SMPS systems performed by the inventors have confirmed that optimal load transient response is obtained for values of the zeros' natural frequencies lying within either of the triangles whose vertices are identified above. In this connection, it is noted that, since the compensation does not depend on the order of the zeros, the search space which needs to be searched to find estimates of the zeros' natural frequencies can be limited to either of these triangles.

In step S330, an output voltage deviation determining module 222 determines, for each of a plurality of points in the search space, a deviation of $V_{out}$ that occurs in response to a variation in a load current of the SMPS 100. Where optional steps S310 and S320 have been performed, the output voltage deviation determining module 222 simulates in step S330, for each of the plurality of points in the triangular search area defined in step S320, how $V_{out}$ deviates from its initial value (corresponding to an initial value of the SMPS load current) in response to the variation in the load current of the SMPS 100 from the initial load current value. This simulation is performed using the model of the SMPS 100 and the model of the feedback loop of the SMPS 100.

The simulation of the load transient response is performed using piece-wise linear differential equation (DE) models.

That is, one DE model is used in each working region of the SMPS, and the models are switched when entering another working region. The final state of the state-variables becomes the initial state for the new model. The simulation can be implemented in any suitable modelling software, such as MATLAB™ or Modellica™.

Referring again to FIG. 12, in step S340, the goal function evaluation module 224 evaluates the goal function G using the determined deviation of $V_{out}$ at each of the plurality of points within the triangular search area to obtain a measure of at least one of a size and a recovery time of the respective output voltage deviation. As noted above, following a load transient, $V_{out}$ may deviate from an initial value to a maximum or minimum value, before decaying back towards its initial value. The goal function G provides a measure of at least one of the maximum SMPS output voltage deviation (e.g. the voltage overshoot observed) during the variation in load current of the SMPS 100, and a recovery time during which $V_{out}$ returns to within a tolerance band of output voltage values following the variation in the load current of the SMPS 100. The boundaries of the tolerance band usually lie a few percent (normally 1-3 percent) above and below the initial output voltage value, and the recovery time corresponds to the time taken by the output voltage to reach either of these boundaries following the occurrence of a load transient. The goal function G may be defined as a weighted average of the voltage deviation and the recovery time, for example in the following general form:

$$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors (in other words, the voltage deviation and recovery time requirements selected by the user) required to allow the voltage deviation and the recovery time to be weighted properly, $w_{Vdev}$ and $w_R$ are weighting factors, and N and M are integers with N≥1 and M≥1. $V_{Dev\_Req}$ and $T_{R\_Req}$ may correspond to the maximum permitted voltage deviation and the longest allowed recovery time selected by the user, respectively.

However, calculation of the recovery time $T_R$ may be time-consuming, and choosing the recovery level, tolerance band, may be difficult and affect the results significantly. It may therefore be preferable to use a standard Norm of the signal, equal to the voltage deviations from the DC level during the transient. A goal function G of the general form mentioned above is thus preferably used, i.e.

$$[\int_0^{T_{trans}} |V_{out}(t) - V_{DC}|^N dt]^{1/N},$$

Thus, N=1 yields an integral of the absolute value of the deviation, N=2 corresponds to the energy norm, while high values of N yield $$\|V_{out}(t) - V_{DC}\|_\infty = \sup_t |V_{out}(t) - V_{DC}|,$$

i.e. the maximal voltage deviation. Hence, by varying the factor N, the relative weightings of the voltage deviation and the recovery time can be varied.

The integral must be calculated using a numerical approximation algorithm, such as a first order approximation as shown below, or a trapezoidal second order approximation:

$$\int_0^{T_{trans}} |V_{out}(t) - V_{DC}|^N dt \approx \sum_{k=1}^{T_{trans}/\Delta t} |V_{out}(k\Delta t) - V_{DC}|^N \Delta t$$

In step S350, the natural frequency estimator 226 estimates a location of a minimum of the goal function G in the triangular search area based on the evaluated values of the goal function G, for example using one of the techniques described above.

Although steps S330 and S340 may be performed sequentially on a set of points in the search area (which may, for example, be arranged in a grid) which defines all of the candidate values of the zeros' natural frequencies to be considered in the estimation of the goal function minimum, steps S330 and S340 are preferably performed sequentially on one point at time during an iterative search process, wherein a new candidate point that provides a better estimate of the goal function minimum is generated in each iteration of the search process.

An example of such a search process which has been devised by the present inventors, and which provides a particularly efficient implementation of steps S330 to S350, will now be described with reference to FIG. 13.

In step S410, the natural frequency estimator 226 calculates the deviation of $V_{out}$ and an associated value of the goal function G for each of the vertices of the triangular search area.

In step S420, the natural frequency estimator 226 replaces the vertex of the triangular search area yielding the greatest value of the goal function G with a vertex within the search area that yields a smaller value of the goal function G to generate a triangle within the search area that is defined by the vertex within the search area and the remaining vertices of the triangular search area.

In step S430, the natural frequency estimator 226 set the value of a program loop counter j to an initial value of 1.

In step S440, the natural frequency estimator 226 calculates the deviation of $V_{out}$ for the new vertex and evaluates the goal function G for the new vertex.

In step S450, the natural frequency estimator 226 replaces the vertex of the triangle yielding the greatest value of the goal function G with a new vertex within the search area that yields a smaller value of the goal function G to generate a new triangle within the search area.

In step S460, the natural frequency estimator 226 updates the value of the loop counter j by incrementing it by 1, and determines whether the updated value of the loop counter j is equal to a threshold value J. Thus, the stopping criterion for stopping the repeated performance of steps S440 and S450 is that a predetermined number J of loop iterations have been performed. In some practical implementations of this search method, the inventors have found that J=15 to 25 is sufficient. However, it should be noted that other stopping criteria, which may relate to the degree of convergence of the search, may alternatively be used. For example, the algorithm may be modified to break out of the loop defined by steps S440 to S460 when the triangle becomes smaller than a predetermined size, e.g. such that the natural frequencies defined by the coordinates of its vertices differ by less than a predetermined amount, e.g. 10 to 20 Hz.

When the stopping criterion has been met (in this example, when the loop counter j reaches the threshold value of J), the process proceeds to step S470, wherein the natural frequency estimator 226 estimates the location of the minimum of the goal function G within the search area based on the evaluated values of the goal function G to obtain an estimate of the natural frequencies of the zeros. For example, the natural frequency estimator 226 may select a point in or on the triangle generated in the final performance of step S450, e.g. one of the vertices of the triangle, preferably the vertex giving the lowest value of the goal function G. The natural frequency estimator 226 may alternatively select a point in or on the triangle generated in the penultimate (or an even earlier) performance of step S450, although less preferably. In each of these cases, the coordinates of the selected point provide the estimate of the natural frequencies of the zeros. The corresponding value of the goal function G is used to guide the binary search described above.

Thus, the numerical optimisation algorithm described above (which is based on the Nelder-Mead method) may be regarded as a pattern search that compares function values at the three vertices of a triangle. The worst vertex, where goal function G is largest, is rejected and replaced with a new vertex. A new triangle is formed and the search is continued. The process generates a sequence of triangles (which might have different shapes), for which the function values at the vertices get smaller and smaller. The size of the triangles is reduced and the coordinates of a point in the search space approximating the minimum of the goal function G are eventually found. However, in contrast to the Nelder-Mead method, which allows the search to extend outside the initial triangle considered in the search, the search method described herein includes the restriction that the smaller triangles generated during the course of the method must all lie within the starting triangle, i.e. within the triangular search area. In other words, no new vertex generated during the search is allowed to be placed outside the bounds of the initial triangular search area. Further details of the Nelder-Mead method and variants thereof may be found in "A simplex method for function minimization" by J. A. Nelder and R. Mead, Computer Journal, Vol. 7, Issue 4, pages 308-313 (Oxford Journals, 1965), and many text books on numerical methods. These methods may be modified in a straight-forward way to incorporate the further restriction discussed above, in order to obtain an algorithm of the more general form described above with reference to FIGS. 11-13. This algorithm has the advantage that it does not require the calculation of any derivatives, which may be computationally expensive, and focuses the search to the relevant part of the search area, thus making it more efficient.

Figure 13:
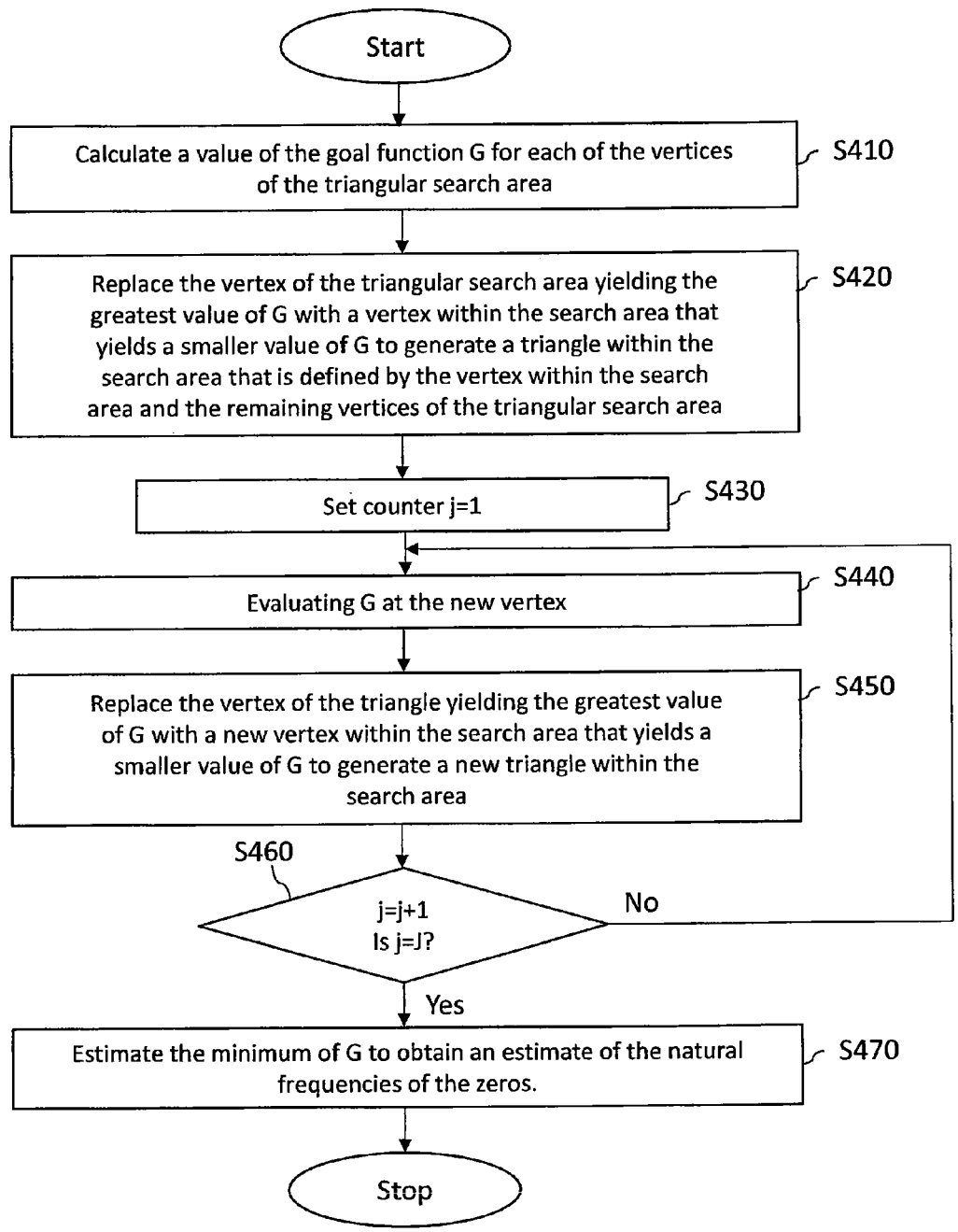
FIG. 13 is a flow diagram illustrating a process for estimating the location of a minimum of the goal function G.
Figure 14A:
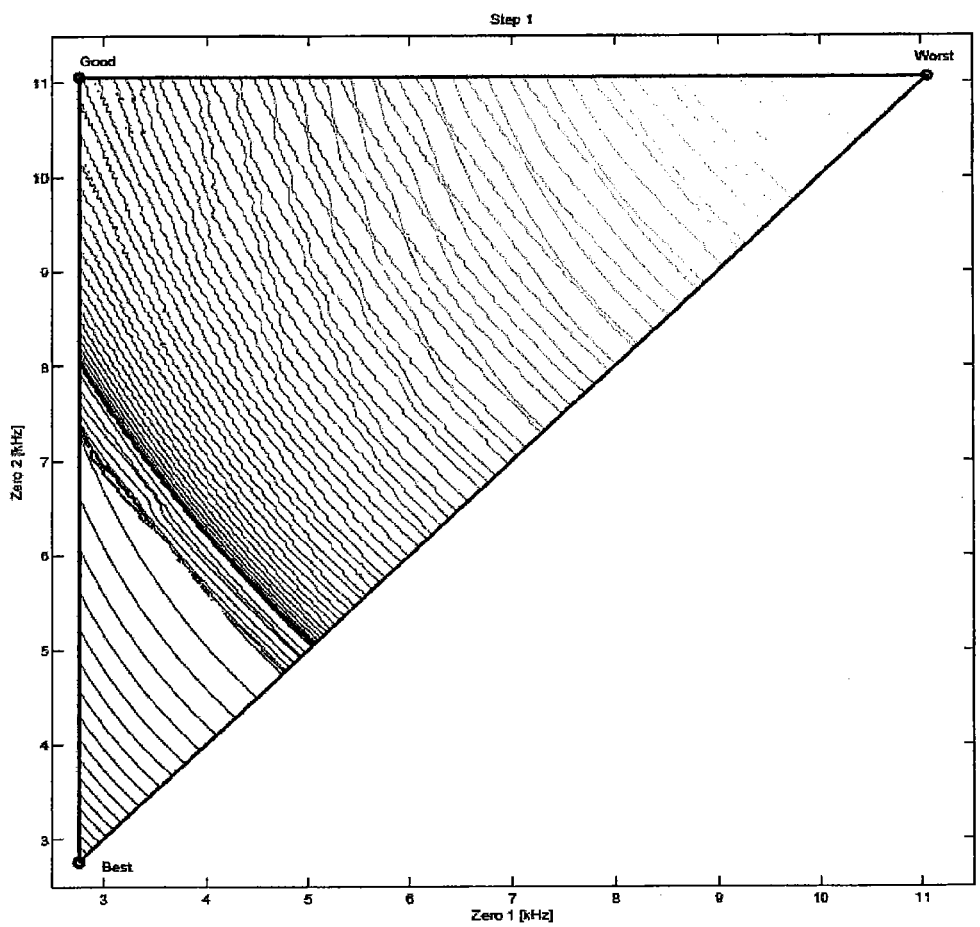
FIGS. 14A to 14C show experimental results that are helpful for understanding the process illustrated in FIG. 13.
Figure 14B:
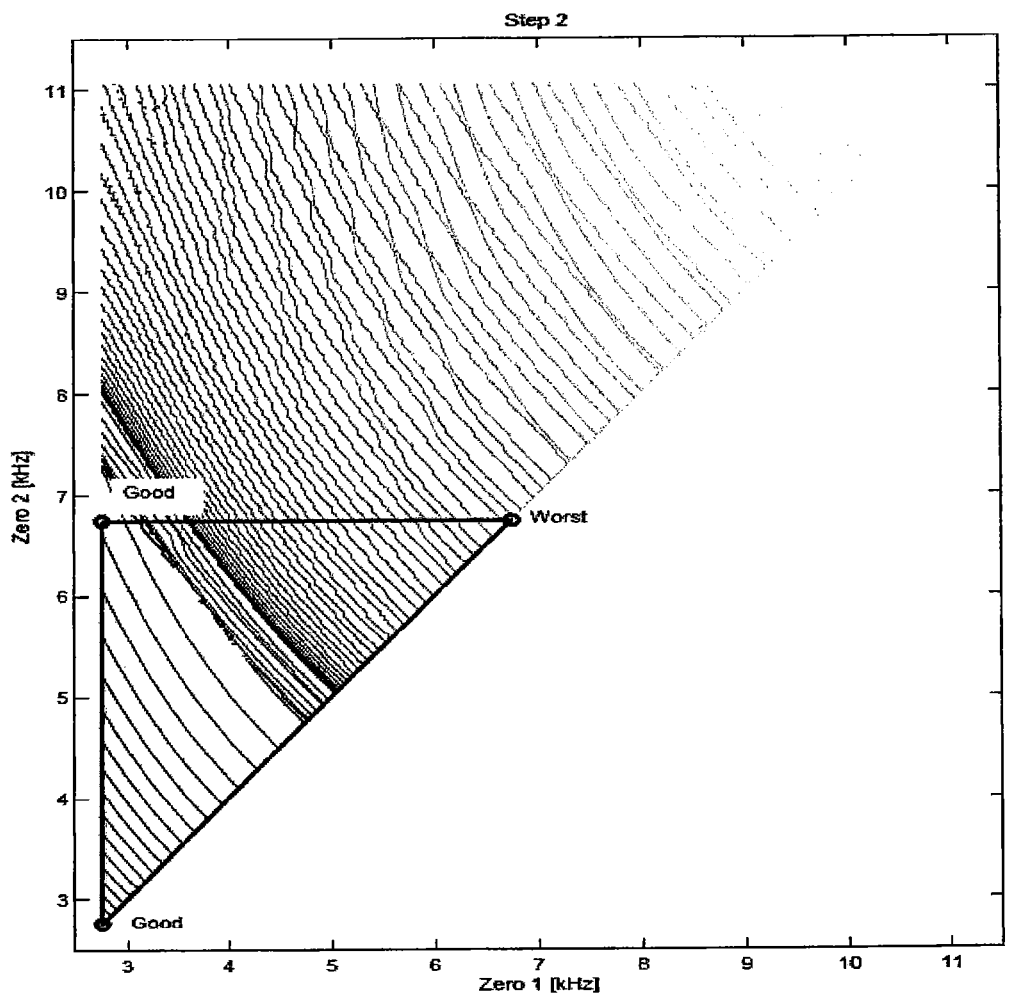
Figure 14C:
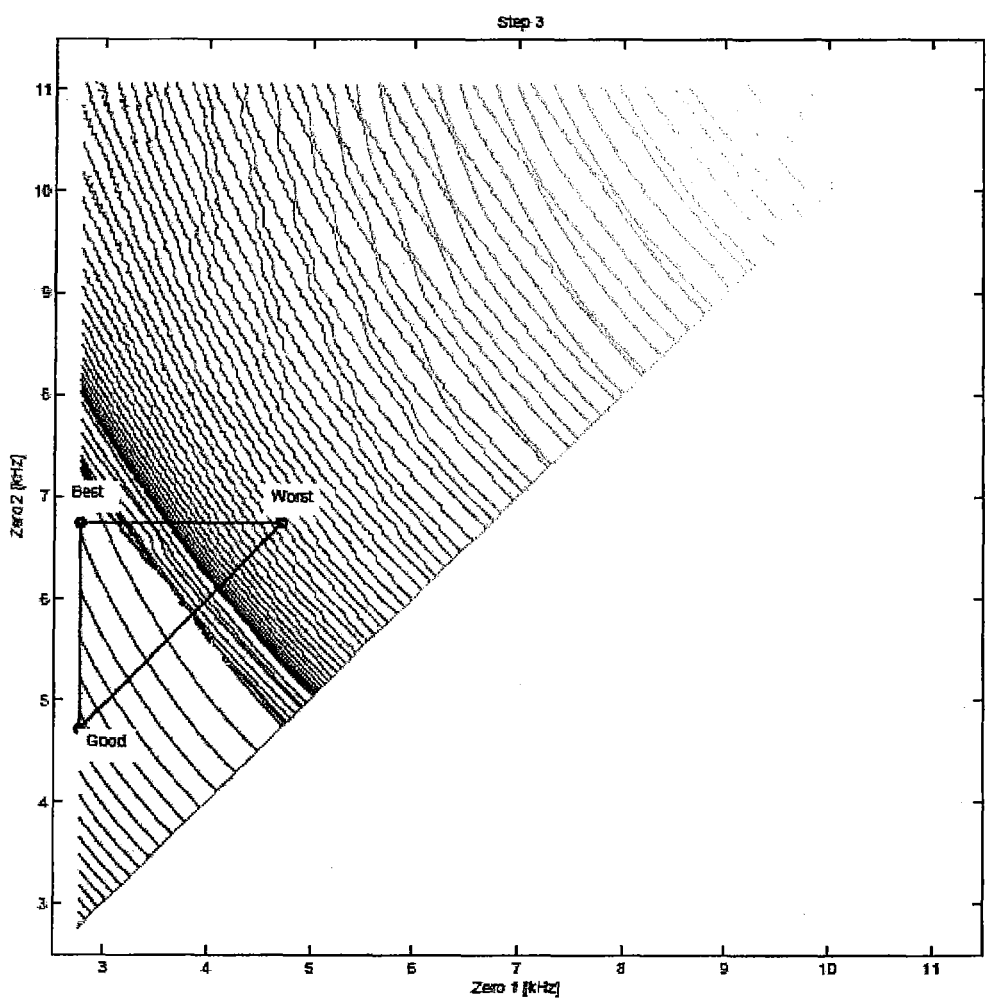

FIGS. 14A to 14C show experimental results that are helpful for understanding the process illustrated in FIG. 13. In these experiments, a huge number of simulations of the SMPS's response to load transients have been performed in order to be able to calculate the goal function G as a detailed surface over the search space, which took 30-48 hours using a high-performance computer. FIGS. 14A to 14C show two-dimensional "equal value" equidistant projections of the goal function G onto the search space. In this example, the goal function G takes the form indicated in the above-described first embodiment, with N=1. In FIG. 14A, the first triangle is shown, and its corners are labelled "Best", "Good", and "Worst", these being ranked in terms of the corresponding goal function values (i.e. with the corner labelled "Best" yielding the lowest value of the goal function G, and the corner labelled "Worst" yielding the largest). This triangle corresponds to the search area mention above.

The result of performing the first iteration of steps S440 and S450 is shown in FIG. 14B. The middle point becomes the new "Best" corner, the former "Best" corner becomes the "Good" corner, and the "Worst" corner is replaced with a better but still "Worst" corner.

The result after the next iteration is shown in FIG. 14C. The middle point between the "Best" and "Good" corners after the first iteration becomes the new "Good" corner, and the "Best" point remains the same. The third corner becomes the "Worst".

[Embodiment 2]

In the first embodiment described above, a binary search is performed to determine the lowest cost capacitor configuration that fulfills the load transient response requirement, specifically by finding, for each candidate capacitor configuration in the ordered set of capacitor configurations, a minimum goal function value for various sets of control law parameter values for the SMPS, and comparing this minimum goal function value to another goal function value that corresponds to the "worst case" output voltage deviation that can be tolerated.

The present embodiment provides an alternative way of finding the capacitor configuration that has the lowest value of the cost function whilst fulfilling the load transient response requirement, which advantageously also allows optimal (or near-optimal) values of control law parameters that meet the load transient response requirement to be found in a highly efficient way. In the present embodiment, the load transient response requirement (hereafter also referred to as the "prescribed output voltage deviation") is taken into account during the search for the optimal (or near-optimal) control law parameter values and forms an integral part of this search process, which is represented by a variant of the process "Sim( )" described above. While the variant of this process, which is employed in the present embodiment, preferably results in the determination of good estimates of the control law parameter values for controlling the feedback loop of the SMPS, the process may instead simply return an indication (e.g. a simple "yes/no" indicator) of whether a candidate capacitor configuration considered in the search process is capable of allowing the control law parameter values to be tuned such that the load transient response requirement is fulfilled.

The apparatus of the present embodiment is the same as that of the first embodiment in many respects, and the description of like components (and the above-mentioned modifications and variations to the first embodiment that are also applicable to the second embodiment) will therefore not be repeated here. However, the differences between the first and second embodiments and, in particular, the functionality of the search module 220-2 of the second embodiment, will now be described with reference to FIGS. 15 to 18. In these figures, like components are identified with like reference signs.

Figure 15:
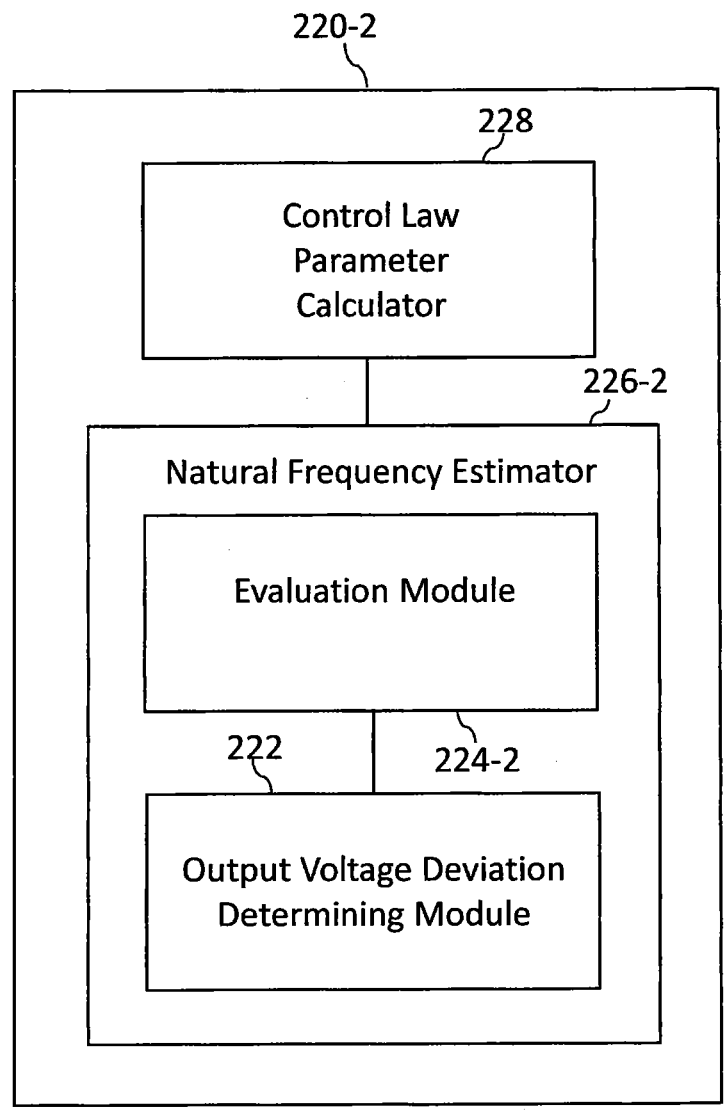
FIG. 15 illustrates functional components of a modified search module according to a second embodiment of the present invention.

The apparatus of the second embodiment comprises a candidate configuration generator module 210 (which is the same as in the first embodiment) and a search module 220-2, the functional components of the search module 220-2 being illustrated in FIG. 15. The search module 220-2 comprises a natural frequency estimator 226-2 having an output voltage deviation determining module 222 and an evaluation module 224-2, which are functionally inter-connected as shown, and a control law parameter calculator 228. While the output voltage deviation determining module 222 and the control law parameter calculator 228 are the same as in the first embodiment, the natural frequency estimator 226-2 and the evaluation module 224-2 are different, as will be explained in the following. It should be noted that the apparatus of the present embodiment may also be implemented in programmable signal processing hardware of the kind described above with reference to FIG. 4.

At a top level, the search module 220-2 of the present embodiment tunes the feedback loop of the SMPS for a candidate capacitor configuration similarly to the first embodiment, as described above with reference to FIG. 5. However, the evaluation module 224-2 of the present embodiment performs, in a variation of step S340 in FIG. 12, an additional process of evaluating the second goal function, G2, using a prescribed deviation of the output voltage, $V_r$, of the SMPS and the determined deviation of the output voltage, $V_{out}$, of the SMPS at each of the plurality of points in the search space to obtain a measure of how much the determined deviation of the output voltage exceeds the prescribed deviation of the output voltage in response to the variation in the load current of the SMPS. The natural frequency estimator 226-2 then estimates the location of the minimum of the (first) goal function G based not only on the evaluated values of the goal function G but also the evaluated values of the second goal function G2.

Figure 16A:
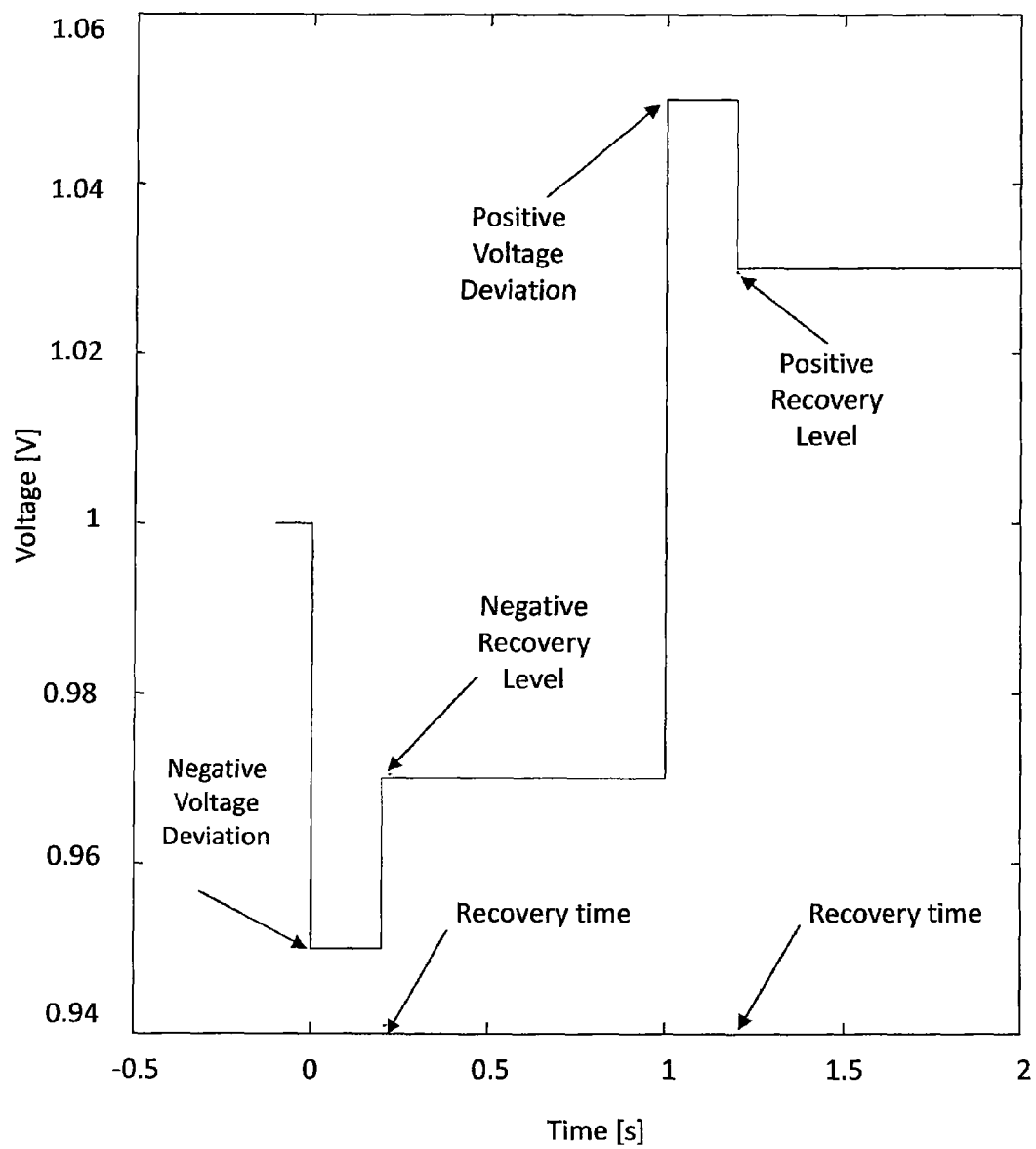
FIG. 16A shows an example of a prescribed output voltage deviation, $v_r(t)$, to be used for evaluating a second goal function, G2, in the second embodiment.

The prescribed deviation of the output voltage of the SMPS may be a time-invariant output voltage deviation which should not be exceeded during operation of the SMPS feedback control loop, e.g. $\pm V_{max}$ Volts, where $V_{max}$ represents the size of the maximum desired voltage deviation. Alternatively, the prescribed output voltage deviation may be specified in terms of a voltage range, e.g. $[-V_{max1}, V_{max2}]$, where $V_{max1}$ and $V_{max2}$ are positive real numbers. However, it may be preferable, as in the present embodiment, for the prescribed deviation of the output voltage to follow a prescribed variation over time. For example, the prescribed output voltage deviation may be specified in terms of a negative maximum voltage deviation, a first recovery time, a negative recovery level, a positive maximum voltage deviation, a second recovery time and a positive recovery level, as illustrated in FIG. 16A. As shown in FIG. 16A, the prescribed output voltage deviation follows a step-like variation with time. In general, the negative maximum voltage deviation and the negative recovery level need not be the same in size as the positive maximum voltage deviation and the positive recovery level, and the first and second recovery times may differ. However, in the example of FIG. 16A, the positive and negative maximum voltage deviations, and the positive and negative recovery levels, are equal in magnitude, and the first and second recovery times are the same.

Of course, it will be appreciated that the time variation of the prescribed output voltage deviation shown in FIG. 16A is only an example, and that the prescribed output voltage deviation may take one of many other different forms, which may be specified by the user in accordance with their requirements. In general, the prescribed time-dependent output voltage deviation is specified by any suitable requirement function, $v_r(t)$.

Figure 16B:
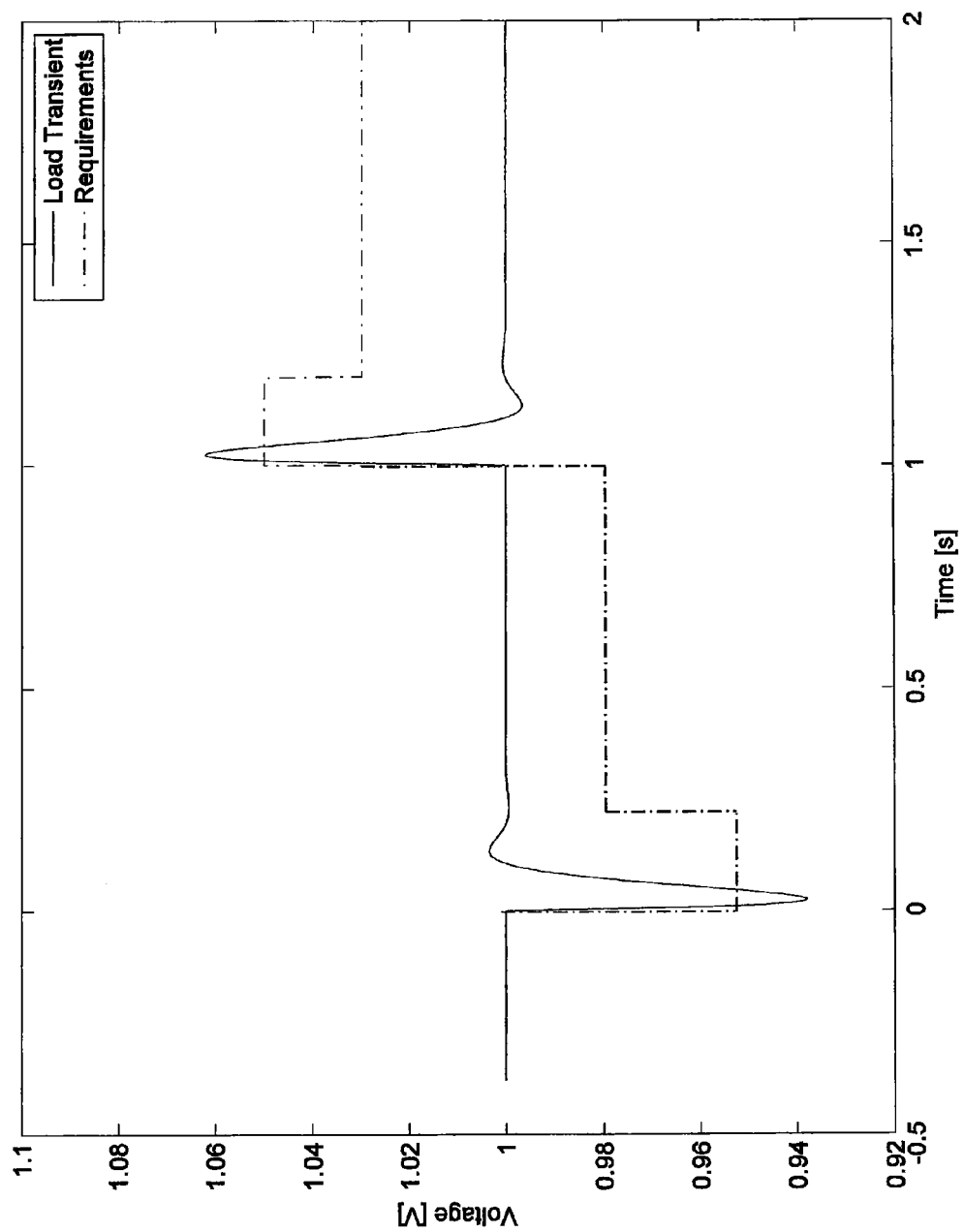
FIGS. 16B to 16F illustrate how the second goal function G2 may be evaluated in the second embodiment.
Figure 16C:
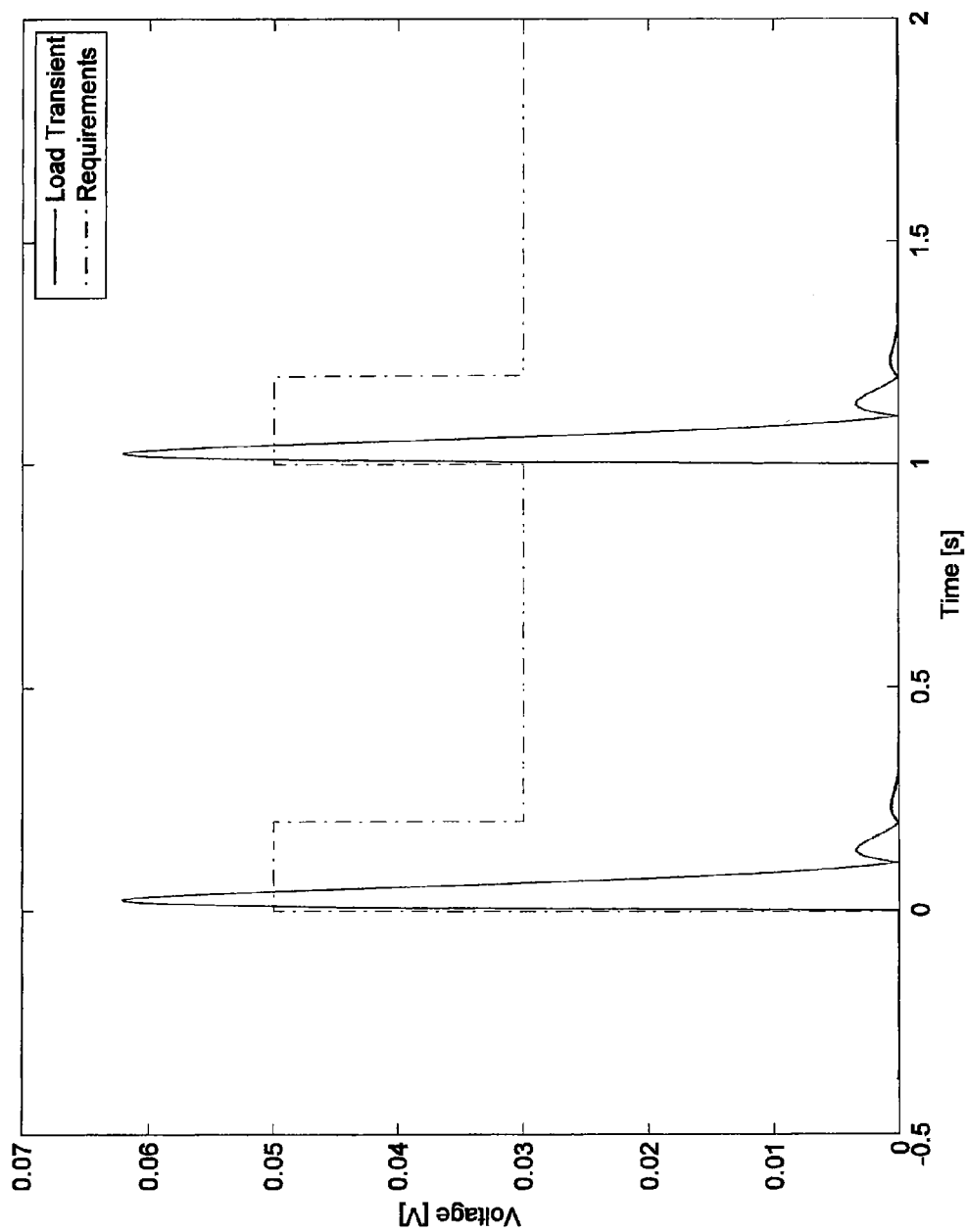
Figure 16D:
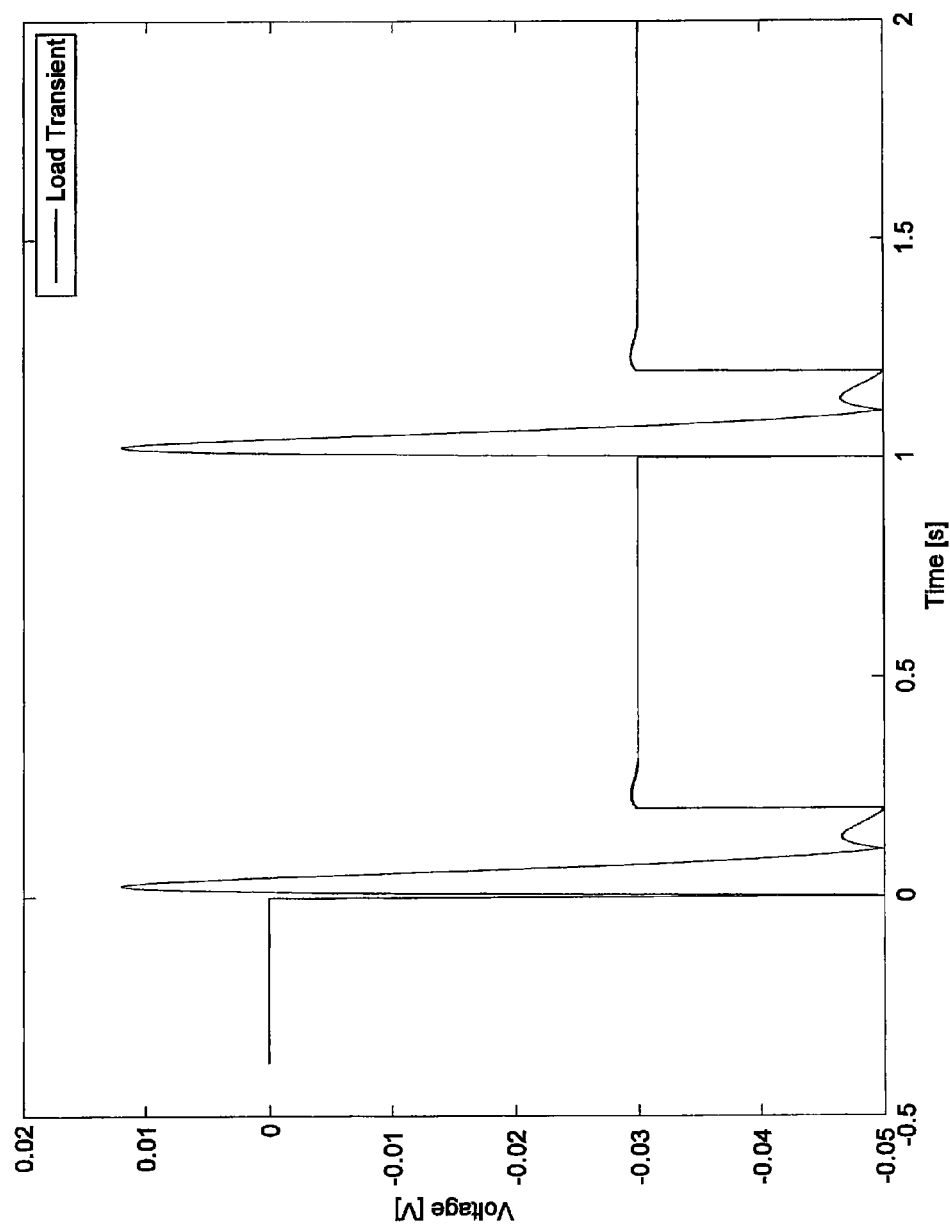
Figure 16E:
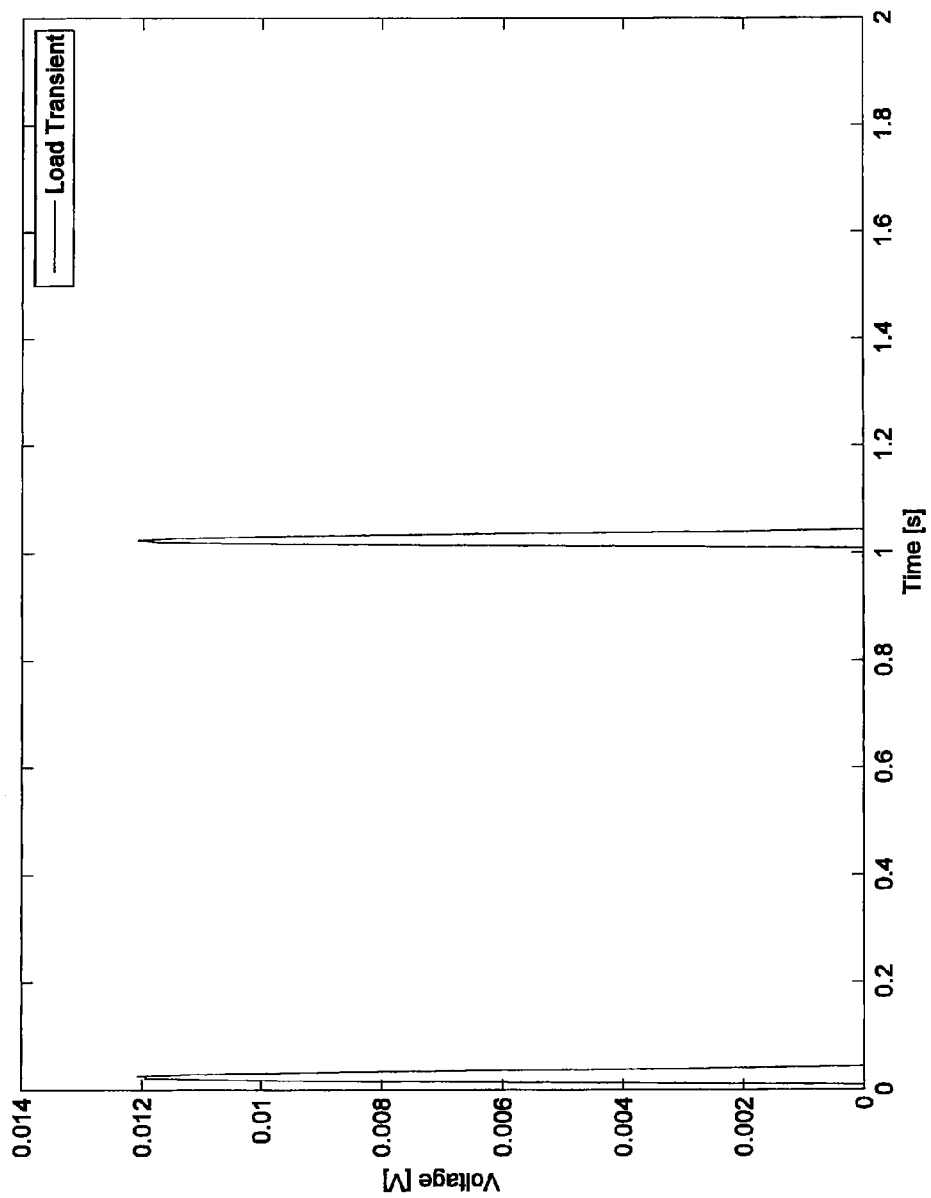
Figure 16F:
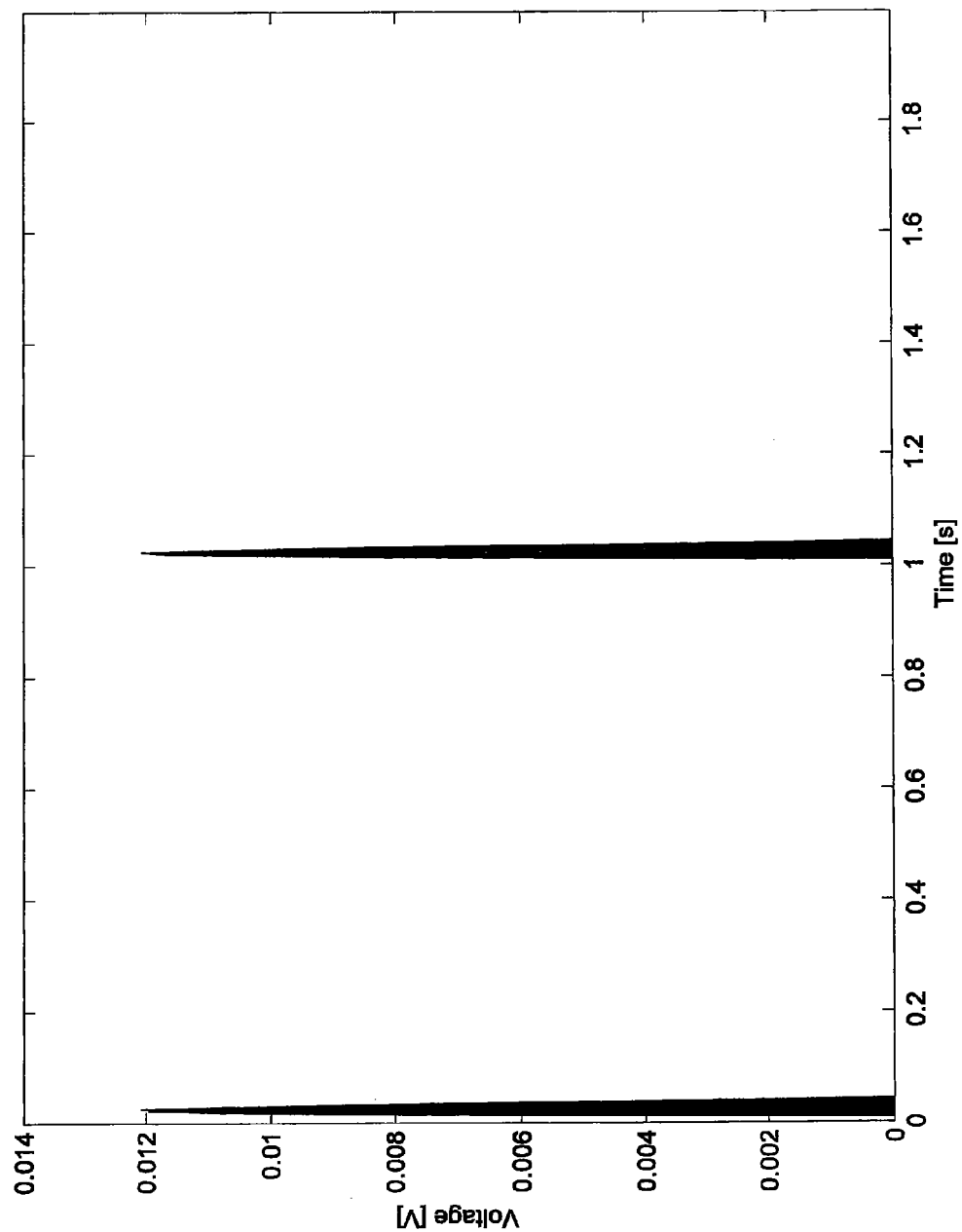

The evaluation of the second goal function G2 in the present example will now be described with reference to FIGS. 16B to 16F. FIG. 16B shows plots of the simulated output voltage deviation, $V_{out}(t)$ (solid line), and the prescribed output voltage deviation matching user requirements, $V_r(t)$ (dashed line). The evaluation begins with the removal of the DC level from each of the traces shown in FIG. 16B, and taking the modulus of the resulting signals. Then, the modulus of the DC-level adjusted requirement function $v_r(t)$ is subtracted from the modulus of the DC-level adjusted voltage $V_{out}(t)$, leading to the result shown in FIG. 16D. Next, only the positive parts of the trace in FIG. 16D are kept, resulting in a trace as shown in FIG. 16E. Finally, the trace shown in FIG. 16E is integrated, as illustrated by the shaded areas in FIG. 16F. In this example, the second goal function G2 is thus evaluated to give a value of $5.18 \cdot 10^{-4}$ Vs.

It will be appreciated from the foregoing that the second goal function of this example may be expressed as follows:

$$G2 = \int_0^{T_{trans}} dt \begin{cases} |V_{out}(t) - V_{DC}| - |V_r(t) - V_{DC}| & , |V_{out}(t) - V_{DC}| - |V_r(t) - V_{DC}| > 0 \\ 0 & , |V_{out}(t) - V_{DC}| - |V_r(t) - V_{DC}| \leq 0 \end{cases}$$

By evaluating a second goal function of the kind described above, the natural frequency estimator 226-2 is able to estimate the natural frequencies of the zeros whilst taking into account whether candidate values of the natural frequencies, which are considered during the estimation of the goal function minimum, fulfil requirements set by the user, i.e. whether the candidate values lead to output voltage deviations that do not exceed the prescribed output voltage deviation. In this way, candidate natural frequencies that lead to satisfactory voltage transients can be selected in preference to candidate natural frequencies that do not, thereby avoiding the need for the user to examine the suitability for the application at hand of an SMPS with an output filter using the resulting capacitor configuration.

The procedure by which the natural frequency estimator 226-2 determines estimates of the natural frequency of each of two zeros in the transfer function of the feedback loop in the present embodiment will now be described with reference to FIG. 17.

Figure 17:
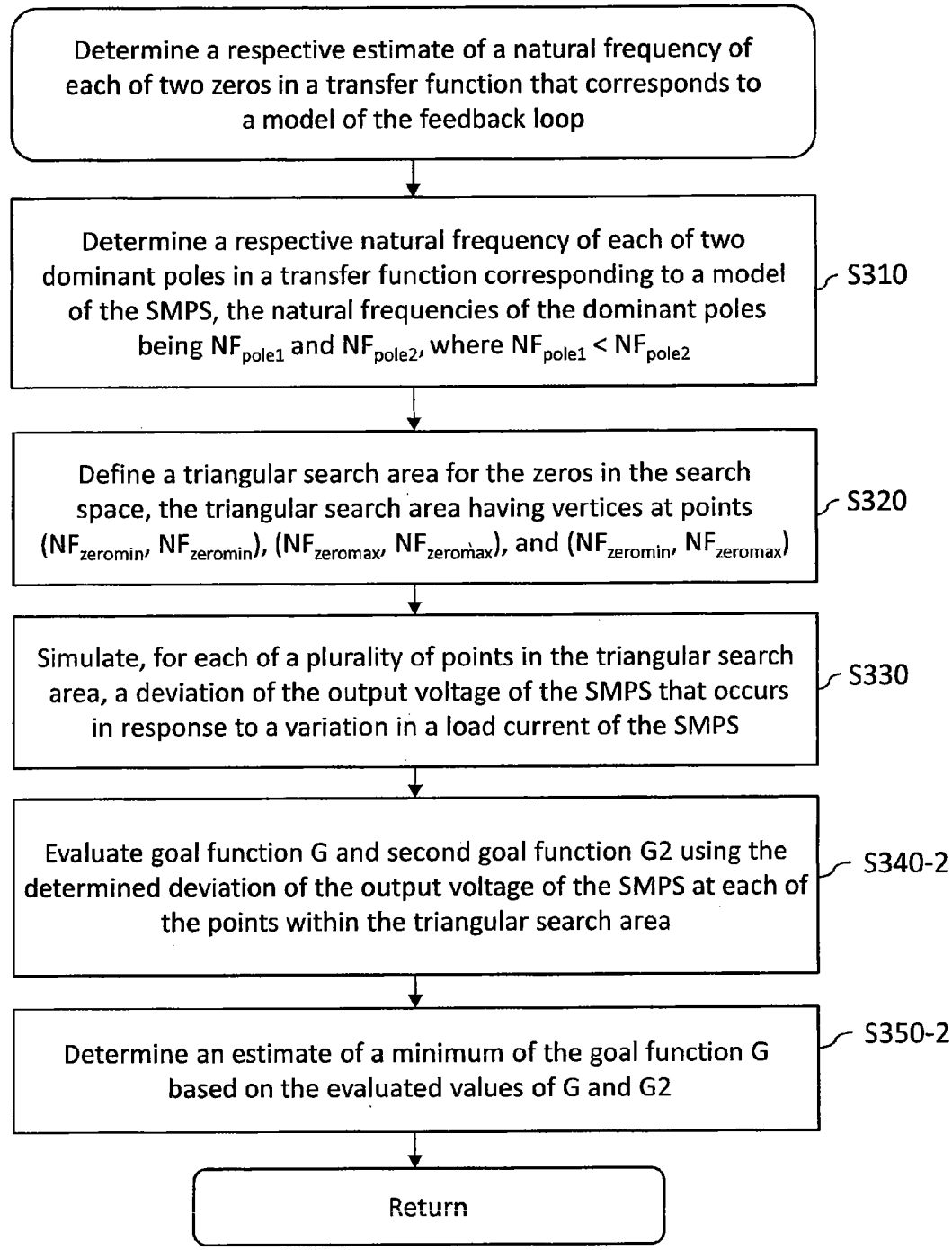
FIG. 17 is a flow diagram illustrating a method of tuning the feedback loop of a SMPS in the second embodiment.

As can be appreciated from FIG. 17, the natural frequency estimation process of the present embodiment employs some processes that are the same as those in FIG. 12, and the details of the common processes (which are labelled with like reference signs) will not be repeated here. The process of FIG. 17 differs from that in FIG. 12 by steps S340-2 and S150-2, as will now be explained.

In step S340-2, the evaluation module 224-2 evaluates not only one of the above-described kinds of first goal function G using the determined deviation of $V_{out}$ at each of the plurality of points within the triangular search area (as in the first embodiment) but also the second goal function, G2, using a prescribed deviation of the output voltage of the SMPS, $V_r(t)$, and the determined deviation of the output voltage of the SMPS, $V_{out}(t)$, at each of the plurality of points in the search space. In step S350-2, the natural frequency estimator 226-2 estimates the location of the minimum of the first goal function G based on the evaluated values of the first goal function G and the evaluated values of the second goal function G2.

As in the case of the first embodiment, although steps S330 and S340-2 in FIG. 17 may be performed sequentially on a set of points in the search area (which may, for example, be arranged in a grid) which defines all of the candidate values of the zeros' natural frequencies to be considered in the estimation of the goal function minimum, steps S330 and S340-2 are preferably performed sequentially on one point at time during an iterative search process, wherein a new candidate point that provides a better estimate of the goal function minimum while satisfying the user requirement is generated in each iteration of the search process.

An example of such a search process which has been devised by the present inventors, and which provides a particularly efficient implementation of steps S330, S340-2 and S350-2, will now be described with reference to FIGS. 18A and 18B.

Figure 18A:
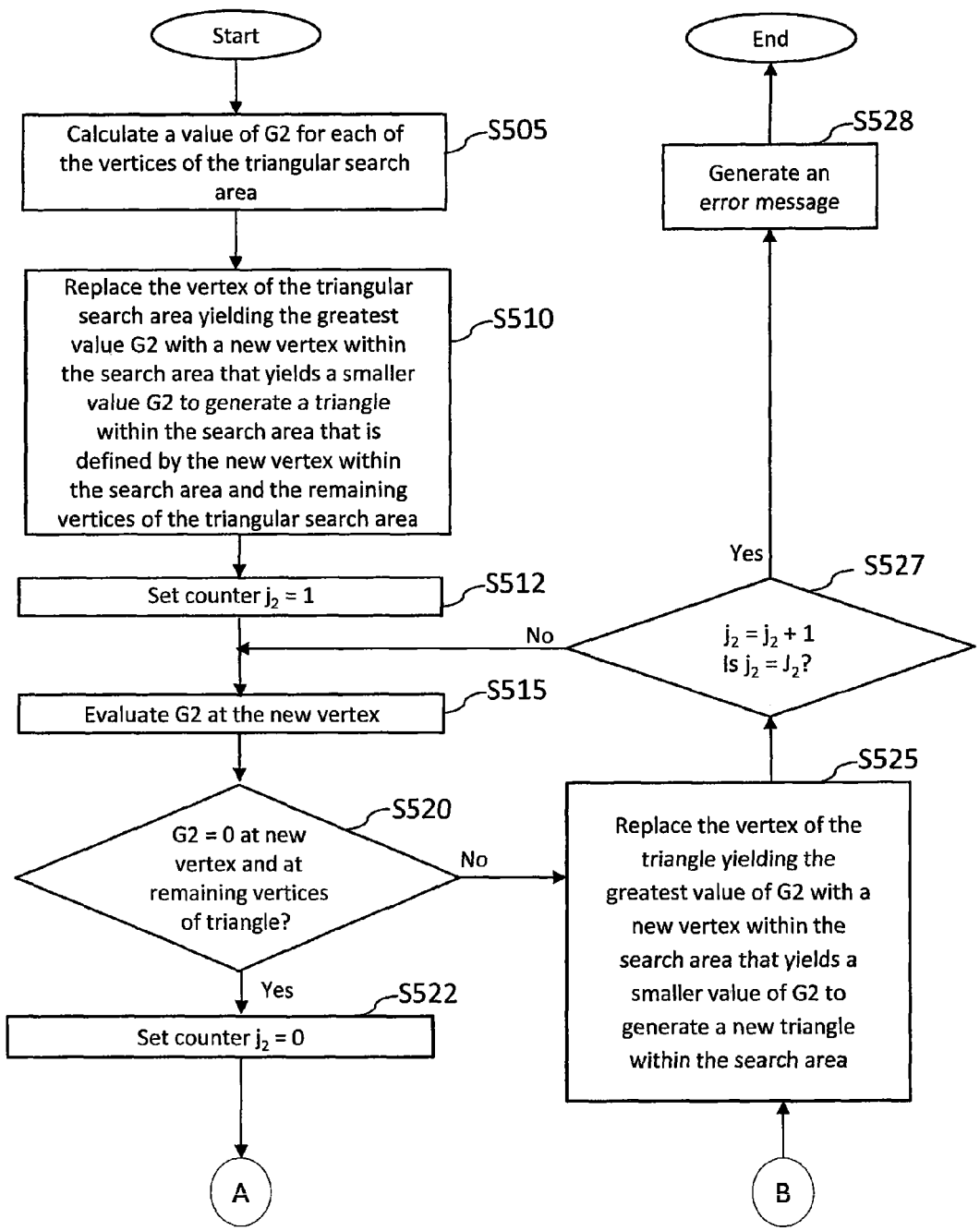
FIGS. 18A and 18B are flow diagrams illustrating a process for estimating the location of a minimum of a goal function used in the tuning of the feedback loop in the second embodiment.
Figure 18B:
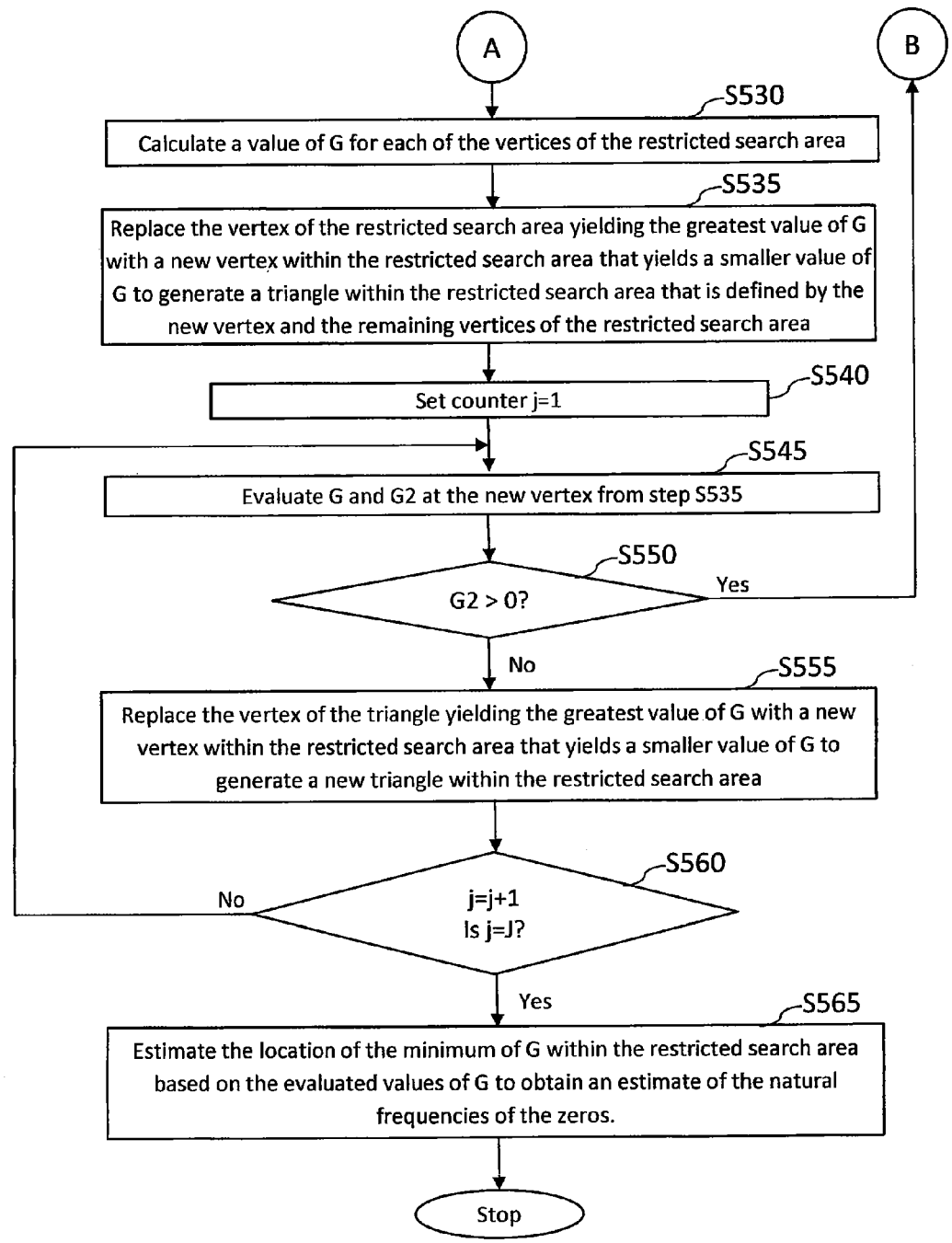
Figure 20:
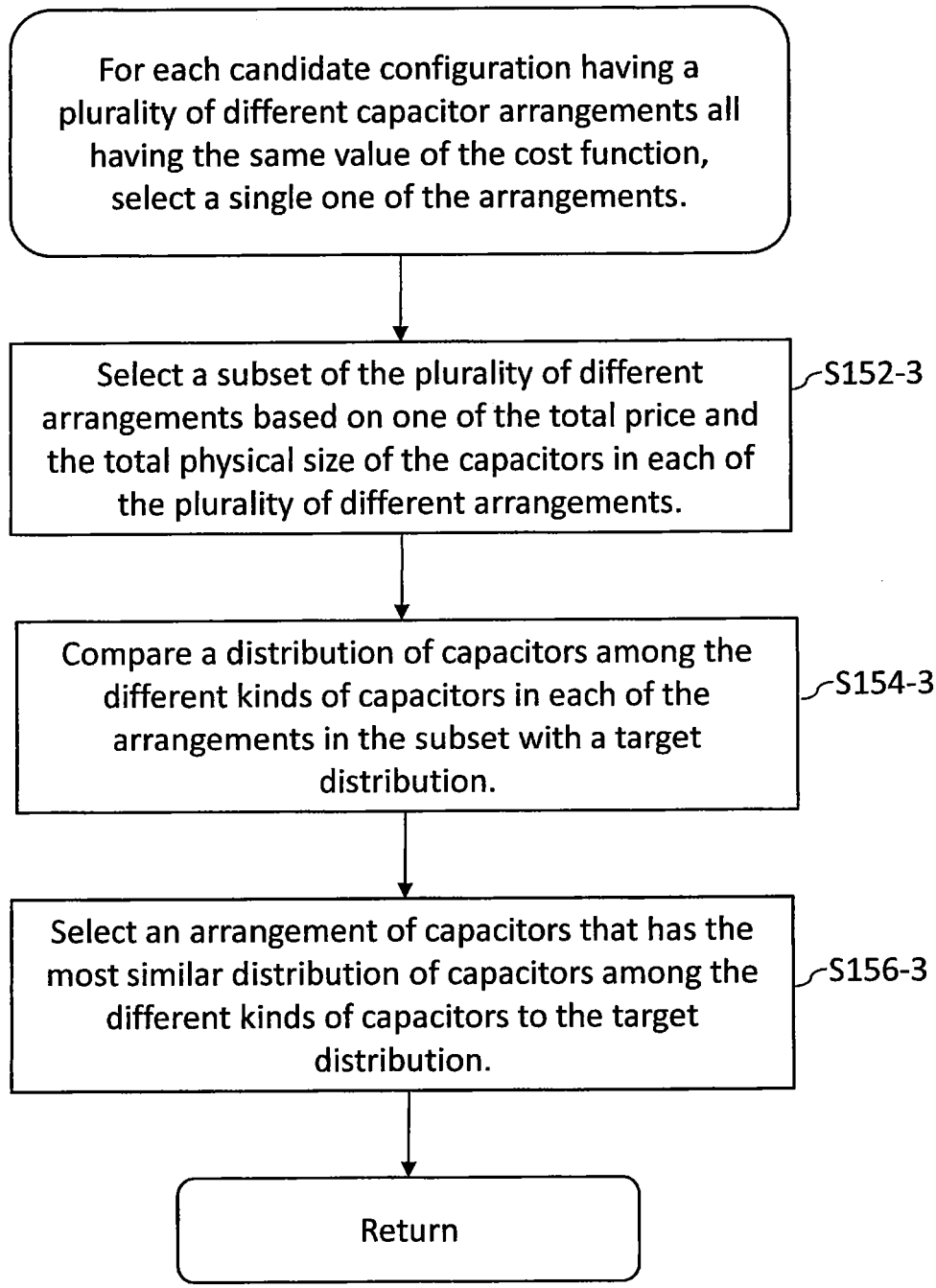
Figure 21:
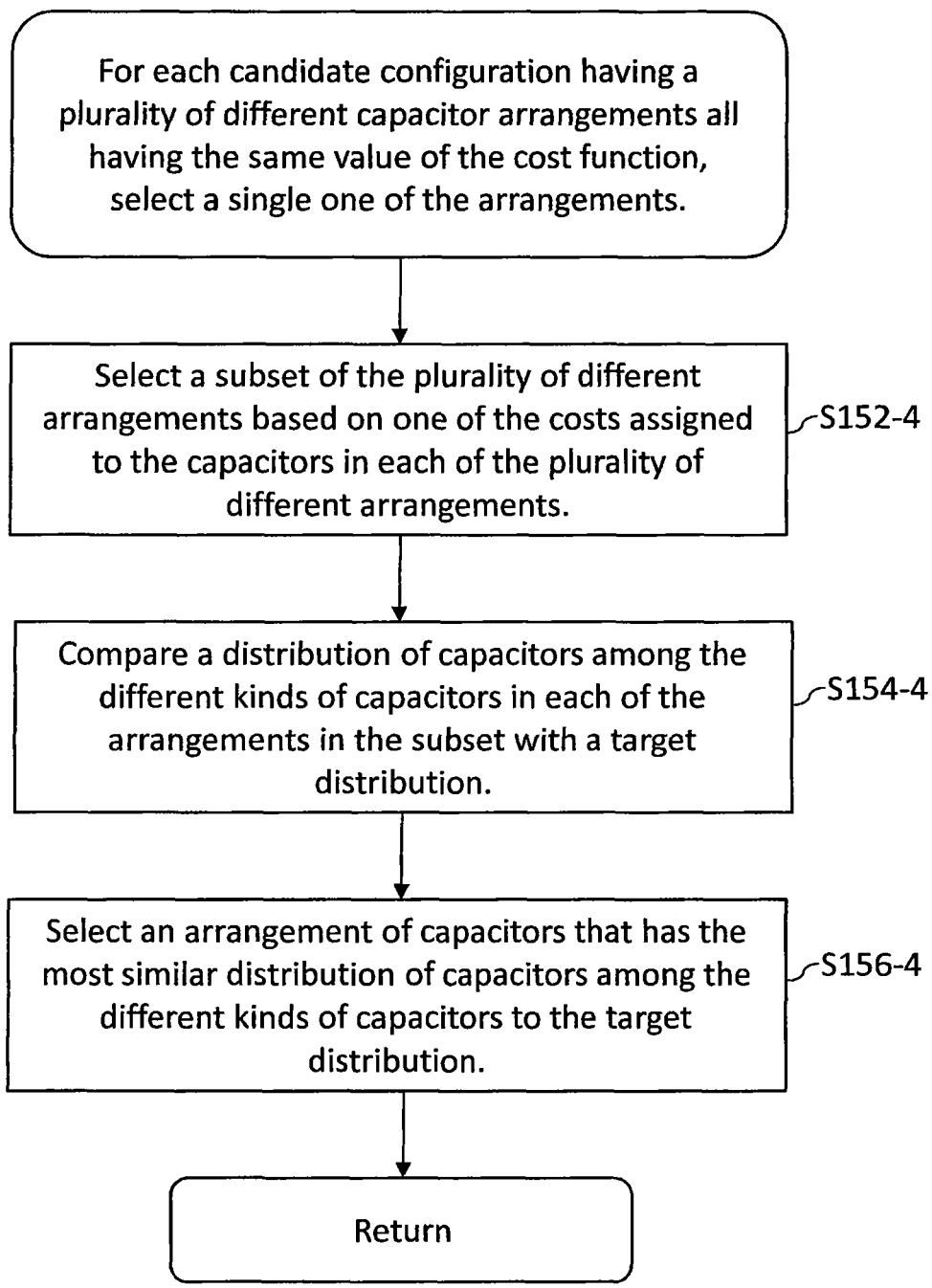

Referring firstly to FIG. 18A, in step S505, the natural frequency estimator 226-2 calculates the deviation of $V_{out}$ and an associated value of the second goal function G2 for each of the vertices of the triangular search area.

In step S510, the natural frequency estimator 226-2 replaces the vertex of the triangular search area yielding the greatest value of G2 with a vertex within the search area that yields a smaller value of G2 to generate a triangle within the search area that is defined by the vertex within the search area and the remaining vertices of the triangular search area.

In step S512, the natural frequency estimator 226-2 sets the value of a program loop counter $j_2$ to an initial value of 1.

In step S515, the natural frequency estimator 226-2 calculates the deviation of $V_{out}$ for the new vertex and evaluates G2 for the new vertex.

In step S520, the natural frequency estimator 226-2 determines whether G2 has been evaluated to be zero at the new vertex in step S515 and has been evaluated to be zero at the remaining vertices of the triangle generated in step S510 (or step S525 as detailed below). If G2 has been evaluated to be zero at the new vertex in step S515 and has been evaluated to be zero at the remaining vertices of the triangle generated in step S510 (or step S525, as the case may be), then the process proceeds to step S522, wherein the natural frequency estimator sets the value of the program loop counter $j_2$ to a value of 0, and the process proceeds to A in FIG. 18B. On the other hand, if it has been determined that G2 is not zero at the new vertex and at the remaining vertices of the triangle generated in step S510, then the process proceeds to step S525, wherein the natural frequency estimator 226-2 replaces the vertex of the triangle yielding the greatest value of G2 with a new vertex within the search area that yields a smaller value of G2 to generate a new triangle within the search area.

In step S527, the natural frequency estimator 226-2 updates the value of the loop counter $j_2$ by incrementing it by 1, and determines whether the updated value of the loop counter $j_2$ is equal to a threshold value $J_2$. If the loop counter $j_2$ reaches the threshold value of $J_2$, the process proceeds to step S528, wherein the natural frequency estimator 226-2 generates an indication that it has not been possible to find natural frequencies that yield an output voltage deviation satisfying the user requirements using the predefined number of iterations, $J_2$. This indication may, as in the present embodiment, be provided to the user in the form of an error message. On the other hand, if the loop counter $j_2$ has not yet reached $J_2$, then the process loops back to step S515, as shown in FIG. 18A.

In this way, steps S515 and S525 may be repeated to generate a series of triangles within the search area until G2 is evaluated to be zero at all three vertices of the final triangle generated in the search area, the final triangle defining a restricted search area which is likely to contain a minimum value of the goal function G that complies with the user requirement.

The search process performed by the natural frequency estimator 226-2 in the restricted search area will now be described with reference to FIG. 18B.

In step S530, the natural frequency estimator 226-2 calculates the deviation of $V_{out}$ and an associated value of the goal function G for each of the vertices of the restricted triangular search area.

In step S535, the natural frequency estimator 226-2 replaces the vertex of the restricted triangular search area yielding the greatest value of G with a vertex within the restricted search area that yields a smaller value of G to generate a triangle within the restricted search area that is defined by the new vertex and the remaining vertices of the restricted search area.

In step S540, the natural frequency-estimator 226-2 sets the value of a program loop counter j to an initial value of 1.

In step S545, the natural frequency estimator 226-2 calculates the deviation of $V_{out}$ for the new vertex and the evaluation module 224-2 evaluates the goal function G and, preferably, also the second goal function G2 for the new vertex.

Where G2 has been evaluated in step S545, the natural frequency estimator 226-2 determines in step S550 whether G2 is greater than zero. If G2>0, then the process loops back to step S525 in FIG. 18A, otherwise the process continues to step S555 in FIG. 18B. In this way, the natural frequency estimator 226-2 may perform a check to ensure that the search in the restricted search area does not lead to solutions that do not comply with user requirements.

In step S555, the natural frequency estimator 226-2 replaces the vertex of the triangle yielding the greatest value of G with a new vertex within the restricted search area that yields a smaller value of G to generate a new triangle within the restricted search area.

In step S560, the natural frequency estimator 226-2 updates the value of the loop counter j by incrementing it by 1, and determines whether the updated value of the loop counter j is equal to a threshold value J. Thus, the stopping criterion for stopping the repeated performance of steps S545, S550 and S555 is that a predetermined number J of loop iterations have been performed. In some practical implementations of this search method, the inventors have found that J=15 to 25 is sufficient. However, it should be noted that other stopping criteria, which may relate to the degree of convergence of the search, may alternatively be used. For example, the algorithm may be modified to break out of the loop defined by steps S545 to S555 when the triangle becomes smaller than a predetermined size, e.g. such that the natural frequencies defined by the coordinates of its vertices differ by less than a predetermined amount, e.g. 10 to 20 Hz.

When the stopping criterion has been met (in this example, when the loop counter j reaches the threshold value of J), the process proceeds to step S565, wherein the natural frequency estimator 226-2 estimates the location of the minimum of the goal function G within the restricted search area based on the evaluated values of G to obtain an estimate of the natural frequencies of the zeros. For example, the natural frequency estimator 226-2 may select a point in or on the triangle generated in the final performance of step S555, e.g. one of the vertices of the triangle, preferably the vertex giving the lowest value of G. The natural frequency estimator 226-2 may alternatively select a point in or on the triangle generated in the penultimate (or an even earlier) performance of step S555, although less preferably. In each of these cases, the coordinates of the selected point provide the estimate of the natural frequencies of the zeros.

By the above-described process, the search module 220-2 performs a binary search on the ordered candidate configurations of capacitors to determine a capacitor configuration associated with a lowest value of the cost function from among candidate configurations of capacitors that are determined during the binary search to allow the load transient response requirement of the SMPS to be fulfilled. When considering each of the candidate configurations of capacitors, the search module 220-2 (more specifically, the natural frequency estimator 226-2 in the present embodiment) performs the process described above with reference to FIGS. 18A and 18B to generate an indication of whether the candidate capacitor configuration allows the control parameters of the SMPS control loop to be tuned so as to allow the load transient response requirement of the SMPS to be fulfilled. In the present embodiment, this indication is provided in the form of an estimate of the natural frequencies of the zeros; in other words, the generation of an estimate of the natural frequencies of the zeros provides an indication to the search module 220-2 that the candidate capacitor configuration allows the control parameters of the SMPS control loop to be tuned so as to allow the load transient response requirement of the SMPS to be fulfilled, while a failure to generate such an estimate in the process of FIGS. 18A and 18B may be taken as an indication to the contrary. The indication need not be provided in this form, and an indication of another kind (e.g. a simple "yes" or "no") may be used instead.

[Modifications and Variations]

Many modifications and variations can be made to the embodiments described above.

For example, the modelling of the power train described above may be replaced by system identification. This may be done by superimposing a disturbance on the normal signal and analysing what happens on the output, for example as described in "System Identification—Theory for the User" by L. Ljung (Prentice-Hall, Englewood Cliffs, ISBN 0-13-881640, 1987). This disturbance can be injected in many different ways. One way is to use relay feedback, as described in "Automatic tuning of PID controllers" by K. J. Åström and T. Hägglund (Instrument Society of America, ISBN 1-55617-081-5, 1988). Alternatively, the disturbance can be injected by causing limit cycles or injecting a noise signal, as described in the doctoral thesis of Zhao Zhenyu, entitled "Design and Practical Implementation of Digital Auto-tuning and Fast-response Controllers for Low-power Switch-mode Power Supplies" (University of Toronto, Canada, 2008).

Furthermore, goal functions different to those described above may be used. For example, as a further alternative, the following goal function may be used as the first goal function G:

$$\left[\frac{V_{Dev}}{V_{Dev\_Req}}\right]^K \left[\frac{T_D}{T_{D\_Req}}\right]^L,$$

wherein K and L are integers with $K \geq 1$ and $L \geq 1$.

Additionally or alternatively, the candidate configuration generator module 210 may be configured to select one of the arrangements that share the same value of the cost function using a different process to that described above with reference to FIG. 7. One such alternative is illustrated in FIG. 15.

In this alternative, the candidate configuration generator module 210 is arranged to select and retain, in step S152-2, a subset of the plurality of different arrangements based on one of a total price and a total physical size of the capacitors in each of the plurality of different arrangements. For example, arrangements that would take up some than an allowed amount of board space might be discarded. Then, in step S154-2, the candidate configuration generator module 210 selects and retains an arrangement from the subset based on the other of the total price and the total physical size of the capacitors in each of the arrangements in the subset. Continuing with the example, the arrangement having the lowest price might be selected from the arrangements that have not been discarded in step S152-2, and kept for further processing.

A further alternative to the process in FIG. 7 is illustrated in FIG. 16, which is based on a combination of the selection process used in the embodiments and that of the alternative set out above. In this variant, the candidate configuration generator module 210 selects and retains, in step S152-3, a subset of the plurality of different arrangements based on one of the total price and the total physical size of the capacitors in each of the plurality of different arrangements. In step S154-3, the candidate configuration generator module 210 compares a distribution of capacitors among the different kinds of capacitors in each of the arrangements in the subset with the target distribution, in a similar manner to that described in the embodiments above. In step S156-3, the candidate configuration generator module 210 selects an arrangement of capacitors that has the most similar distribution of capacitors among the different kinds of capacitors to the target distribution, and keeps the selected arrangement for further processing, discarding the others.

As a yet further alternative to the process in FIG. 7, the candidate configuration generator module 210 may perform the selection in the manner illustrated in FIG. 17. This variant may be used when the cost assigned to each kind of capacitor is indicative of a weighted sum of the price and the physical size of the kind of capacitor. In step S152-4, the candidate configuration generator module 210 selects and retains a subset of the plurality of different arrangements based on a total of the costs assigned to the capacitors in each of the plurality of different arrangements. Thus, for example, only those arrangements having a desirable combination of price and footprint may be retained at this stage of the selection process. Then, in step S154-4, the candidate configuration generator module 210 compares a distribution of capacitors among the different kinds of capacitors in each of the arrangements in the subset with the target distribution. In step S156-4, the candidate configuration generator module 210 selects and retains for further processing an arrangement of capacitors that has the most similar distribution of capacitors among the different kinds of capacitors to the target distribution, and discards the other arrangements.

In the second embodiment, both G2 and G are evaluated to determine optimal (or near-optimal) control law parameter values for capacitor configurations for which there exist control law parameter values which allow the load transient response requirement of the SMPS to be fulfilled. However, as it may in some cases be sufficient to merely determine whether there exists a set of control law parameters for which the determined voltage deviation meets the load transient requirements, the search module alternatively be configured to perform only the processes illustrated in FIG. 18A (thus evaluating G2 but not G), in order to find the lowest cost capacitor configuration that meets the load transient response requirement of the SMPS. Calculations of G could in this case only be performed for the determined capacitor configuration to determine optimal (or near-optimal) control law parameter values, further improving the efficiency of the binary search.

It will be appreciated that the ordering of many of the steps in the above-described processes may be changed, and that some of the steps may be performed concurrently. For example, in FIG. 6, steps A110 and S120 may be interchanged, as may steps S120 and S130.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A method of determining a configuration of capacitors in an output filter of a switched mode power supply, SMPS, the method comprising:
   generating candidate configurations of capacitors defining respective arrangements of capacitors of different kinds in the output filter, each candidate configuration being associated with a respective value of a cost function that is calculated based on a number of capacitors of each kind in the candidate configuration and a cost assigned to each kind of capacitor, the candidate configurations being ordered in order of increasing or decreasing values of the cost function;
   performing a binary search on the ordered candidate configurations of capacitors to determine a capacitor configuration associated with a lowest value of the cost function from among candidate configurations of capacitors that are determined during the binary search to allow a load transient response requirement of the SMPS to be fulfilled,
   wherein whether a candidate configuration allows the load transient response requirement of the SMPS to be fulfilled is determined using a model of a SMPS having the candidate configuration of the output filter to simulate a deviation of an output voltage of the SMPS in response to a change in a load current of the SMPS, and determining whether the load transient response requirement is fulfilled based on the simulated deviation of the output voltage, and
   wherein performing the binary search comprises determining values of control law parameters for turning a feedback loop that is arranged to regulate the output voltage of the SMPS, in accordance with a control law defined by the control law parameters, the control law parameter values being determined by:
   determining a respective estimate of a natural frequency of each of two zeros in a transfer function that corresponds to a model of the feedback loop by:
      determining, for each of a plurality of points in a search space, wherein the coordinates of each of the points correspond to candidate values of the natural frequencies of the zeros, a deviation of the output voltage of the SMPS that occurs in response to a variation in the load current of the SMPS,
      evaluating a goal function using the determined deviation of the output voltage of the SMPS at each of the plurality of points to obtain a measure of at least one of a size and a recovery time of the respective output voltage deviation,
   estimating a location of a minimum of the goal function in the search space based on the evaluated values of the goal function, the location of the minimum of the goal function corresponding to the natural frequencies of the zeros, and
      calculating, based on the determined estimates of the natural frequencies of the zeros, the control law parameter values for tuning the feedback loop; and
   assembling the SMPS having the output filter with the capacitor configuration that is determined to be associated with the lowest value of the cost function from among the candidate configurations of capacitors.

2. The method according to claim 1, wherein the cost assigned to each kind of capacitor is indicative of at least one of a price and a physical size of the kind of capacitor.

3. The method according to claim 2, wherein the cost assigned to each kind of capacitor is indicative of a weighted sum of the price and the physical size of the kind of capacitor.

4. The method according to claim 3, wherein:
   at least one of the candidate configurations comprises a plurality of different arrangements of capacitors of different kinds in the output filter, all of the different arrangements being associated with the same value of the cost function; and
   generating candidate configurations of capacitors further comprises selecting, for each of the at least one candidate configuration having a plurality of different arrangements of capacitors of different kinds in the output filter, an arrangement of capacitors from the plurality of different arrangements that are to be retained for the binary search, the selection being performed by:
      selecting a subset of the plurality of different arrangements based on a total of the costs assigned to the capacitors in each of the plurality of different arrangements;
      comparing a distribution of capacitors among the different kinds of capacitors in each of the arrangements in the subset with a target distribution; and
      selecting an arrangement of capacitors that has the most similar distribution of capacitors among the different kinds of capacitors to the target distribution.

5. The method according to claim 2, wherein:
   at least one of the candidate configurations comprises a plurality of different arrangements of capacitors of different kinds in the output filter, all of the different arrangements being associated with the same value of the cost function; and
   generating candidate configurations of capacitors further comprises selecting, for each of the at least one candidate configuration having a plurality of different arrangements of capacitors of different kinds in the output filter, an arrangement of capacitors from the plurality of different arrangements that are to be retained for the binary search, the selection being performed by:
      selecting a subset of the plurality of different arrangements based on one of a total price and a total physical size of the capacitors in each of the plurality of different arrangements; and
      selecting an arrangement from the subset based on the other of the total price and the total physical size of the capacitors in each of the arrangements in the subset.

6. The method according to claim 2, wherein:
   at least one of the candidate configurations comprises a plurality of different arrangements of capacitors of different kinds in the output filter, all of the different arrangements being associated with the same value of the cost function; and
   generating candidate configurations of capacitors further comprises selecting, for each of the at least one candidate configuration having a plurality of different arrangements of capacitors of different kinds in the output filter, an arrangement of capacitors from the plurality of different arrangements that are to be retained for the binary search, the selection being performed by:
  comparing a distribution of capacitors among the different kinds of capacitors in each of the plurality of different arrangements with a target distribution; and
  selecting an arrangement of capacitors that has the most similar distribution of capacitors among the different kinds of capacitors to the target distribution.

7. The method according to claim 2, wherein;
at least one of the candidate configurations comprises a plurality of different arrangements of capacitors of different kinds in the output filter, all of the different arrangements being associated with the same value of the cost function; and
generating candidate configurations of capacitors further comprises selecting, for each of the at least one candidate configuration having a plurality of different arrangements of capacitors of different kinds in the output filter, an arrangement of capacitors from the plurality of different arrangements that are to be retained for the binary search, the selection being performed by:
  selecting a subset of the plurality of different arrangements based on one of a total price and a total physical size of the capacitors in each of the plurality of different arrangements;
  comparing a distribution of capacitors among the different kinds of capacitors in each of the arrangements in the subset with a target distribution; and
  selecting an arrangement of capacitors that has the most similar distribution of capacitors among the different kinds of capacitors to the target distribution.

8. The method according to claim 1, wherein the goal function provides a measure of at least one of a maximum SMPS output voltage deviation during the variation in load current of the SMPS, and a recovery time during which the output voltage of the SMPS returns to within a tolerance band of output voltage values following the variation in the load current of the SMPS.

9. The method according to claim 8, wherein the goal function comprises $$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors, $w_{Vdev}$ and $w_R$ are weighting factors, and N and M are integers with N≥1 and M≥1.

10. The method according to claim 8, wherein the goal function comprises $$\left[\frac{V_{Dev}}{V_{Dev\_Req}}\right]^K \left[\frac{T_R}{T_{R\_Req}}\right]^L,$$

wherein $V_{dev}$ denotes the maximum SMPS output voltage deviation, $T_R$ denotes the recovery time, $V_{Dev\_Req}$ and $T_{R\_Req}$ are normalization factors, and K and L are integers with K≥1 and L≥1.

11. The method according to claim 8, wherein the goal function comprises $$[\int_0^{T_{trans}} |V_{out}(t) - V_{DC}|^N dt]^{1/N},$$

wherein $V_{out}(t)$ denotes the deviation in the output voltage of the SMPS that occurs in response to the variation in the load current of the SMPS, $T_{trans}$ denotes the duration of the variation in the load current of the SMPS, $V_{DC}$ denotes a DC voltage from which the output voltage of the SMPS deviates in response to the variation in the load current of the SMPS, and N is an integer greater than or equal to 1.

12. The method according to claim 1, wherein the estimates of the respective natural frequencies of the zeros are determined by:
  determining a respective natural frequency of each of two dominant poles in a transfer function corresponding to the model of the SMPS, the natural frequencies of the dominant poles being $NF_{pole1}$ and $NF_{pole2}$, where $NF_{pole1} \leq NF_{pole2}$;
  defining a triangular search area for the zeros in the search space, the triangular search area having vertices at points ($NF_{zeromin}$, $NF_{zeromin}$), ($NF_{zeromax}$, $NF_{zeromax}$), and one of ($NF_{zeromin}$, $NF_{zeromax}$) and ($NF_{zeromax}$, $NF_{zeromin}$), where $NF_{zeromin} = NF_{pole1}/r_{min}$, $NF_{zeromax} = NF_{pole2} \cdot r_{max}$, and $r_{min}$ and $r_{max}$ are range factors each between 1.5 and 3;
  simulating, for each of a plurality of points in the triangular search area, a deviation of the output voltage of the SMPS that occurs in response to the variation in the load current of the SMPS, using the model of the SMPS and the model of the feedback loop;
  evaluating the goal function using the simulated deviation of the output voltage of the SMPS at each of the plurality of points within the triangular search area to obtain the measure of at least one of the physical size and the recovery time of the respective output voltage deviation; and
  estimating the location of the minimum of the goal function within the triangular search area based on the evaluated values of the goal function.

13. The method according to claim 12, wherein the natural frequencies of the zeros are estimated by:
  (i) calculating a value of the goal function for each of the vertices of the triangular search area;
  (ii) replacing the vertex of the triangular search area yielding the greatest value of the goal function with a vertex within the search area that yields a smaller value of the goal function to generate a triangle within the search area that is defined by the vertex within the search area and the remaining vertices of the triangular search area;
  (iii) evaluating the goal function at the new vertex;
  (iv) replacing the vertex of the triangle yielding the greatest value of the goal function with a new vertex within the search area that yields a smaller value of the goal function to generate a new triangle within the search area;
  (v) repeating steps (iii) and (iv) to generate a series of triangles within the search area until a stopping criterion is met; and
  (vi) when the stopping criterion is met, estimating the location of the minimum of the goal function within the search area based on the evaluated values of the goal function to obtain an estimate of the natural frequencies of the zeros.

14. The method according to claim 13, wherein step (vi) comprises selecting a point in or on the triangle generated in the final performance of step (iv), the coordinates of the selected point providing the estimate of the natural frequencies of the zeros.

15. The method according to claim 12, further comprising:
  evaluating a second goal function using a prescribed deviation of the output voltage of the SMPS and the determined deviation of the output voltage of the SMPS at each of the plurality of points in the triangular search area to obtain a measure of how much the determined deviation of the output voltage exceeds the prescribed deviation of the output voltage in response to the variation in the load current of the SMPS,
  wherein the natural frequencies of the zeros are estimated by:
    (i) calculating a value of the second goal function for each of the vertices of the triangular search area;
    (ii) replacing the vertex of the triangular search area yielding the greatest value of the second goal function with a new vertex within the search area that yields a smaller value of the second goal function to generate a triangle within the search area that is defined by the new vertex within the search area and the remaining vertices of the triangular search area;
    (iii) evaluating the second goal function at the new vertex;
    (iv) replacing the vertex of the triangle yielding the greatest value of the second goal function with a new vertex within the search area that yields a smaller value of the second goal function to generate a new triangle within the search area;
    (v) repeating steps (iii) and (iv) to generate a series of triangles within the search area until the second goal function is evaluated to be zero at the new vertex in step (iii) and has been evaluated to be zero at the remaining vertices of the triangle generated in the final performance of step (iv), the triangle generated in the final performance of step (iv) defining a restricted triangular search area;
    (vi) calculating a value of the goal function for each of the vertices of the restricted search area;
    (vii) replacing the vertex of the restricted search area yielding the greatest value of the goal function with a new vertex within the restricted search area that yields a smaller value of the goal function to generate a triangle within the restricted search area that is defined by the new vertex and the remaining vertices of the restricted search area;
    (viii) evaluating the goal function at the new vertex from step (vii);
    (ix) replacing the vertex of the triangle yielding the greatest value of the goal function with a new vertex within the restricted search area that yields a smaller value of the goal function to generate a new triangle within the restricted search area;
    (x) repeating steps (viii) and (ix) to generate a series of triangles within the restricted search area until a stopping criterion is met; and
    (xi) when the stopping criterion is met, estimating the location of the minimum of the goal function within the restricted search area based on the evaluated values of the goal function to obtain an estimate of the natural frequencies of the zeros.

16. The method according to claim 15, wherein step (xi) comprises selecting a point in or on the triangle generated in the final performance of step (ix), the coordinates of the selected point providing the estimate of the natural frequencies of the zeros.

17. The method according to claim 15, wherein step (viii) further comprises evaluating the second goal function at the new vertex from step (vii) and, when the second goal function is evaluated to be greater than zero at the new vertex from step (vii), the method comprises repeating steps (iv) to (viii), otherwise continuing to step (ix).

18. The method according to claim 1, wherein determining a respective estimate of the natural frequency of each of two zeros in the transfer function further comprises:
  evaluating a second goal function using a prescribed deviation of the output voltage of the SMPS and the determined deviation of the output voltage of the SMPS at each of the plurality of points in the search space to obtain a measure of how much the determined deviation of the output voltage exceeds the prescribed deviation of the output voltage in response to the variation in the load current of the SMPS,
  wherein the location of the minimum of the goal function is estimated based on the evaluated values of the goal function and the evaluated values of the second goal function.

19. The method according to claim 18, wherein the prescribed deviation of the output voltage of the SMPS follows a prescribed variation over time.

20. The method according to claim 1, wherein the feedback loop comprises a PID regulator, and the model of the feedback loop models the feedback loop as a PID regulator, the control law parameters comprising the P, I and D control parameters of the PID regulator.

21. A non-transitory computer-readable storage medium storing computer program instructions which, when executed by a processor, cause the processor to perform a method as set out in at least claim 1.

22. An apparatus for determining a configuration of capacitors in an output filter of a switched mode power supply, SMPS, the apparatus comprising:
  a processor; and
  a memory coupled to the processor and storing program code executed by the processor, the program code comprising:
    a candidate configuration generator module arranged to generate candidate configurations of capacitors defining respective arrangements of capacitors of different kinds in the output filter, the candidate configuration generator module comprising:
      a cost calculation module arranged to evaluate, for each candidate configuration, a cost function based on a number of capacitors of each kind in the candidate configuration and a cost assigned to each kind of capacitor; and
      an association module arranged to associate each candidate configuration with a respective value of the cost function calculated by the cost calculation module,
      wherein the candidate configuration generator module is arranged to order the candidate configurations in order of increasing or decreasing values of the cost function; and
    a search module arranged to perform a binary search on the ordered candidate configurations of capacitors to determine a capacitor configuration associated with a lowest value of the cost function from among candidate configurations of capacitors that are determined during the binary search to allow a load transient response requirement of the SMPS to be fulfilled, the search module comprising:
      an output voltage deviation determining module arranged to simulate a deviation of an output voltage of the SMPS in response to a change in a load current of the SMPS, using a model of a SMPS having a candidate configuration of the output filter; and
an evaluation module arranged to determine whether the candidate configuration of capacitors allows the load transient response requirement to be fulfilled based on the simulated deviation of the output voltage,
wherein the search module is further arranged to determine values of control law parameters for tuning feedback loop that is arranged to regulate the output voltage of the SMPS, in accordance with a control law defined by the control law parameters, the search module further comprising:
a natural frequency estimator arranged to determine a respective estimate of a natural frequency of each of two zeros in a transfer function that corresponds to a model of the feedback loop, the natural frequency estimator comprising the output voltage deviation determining module and the evaluation module, wherein:
the output voltage deviation determining module is arranged to simulate, for each of a plurality of points in a search space, wherein the coordinates of each of the points correspond to candidate values of the natural frequencies of the zeros, a deviation of the output voltage of the SMPS that occurs in response to a variation in the load current of the SMPS, using the model of the SMPS and the model of the feedback loop;
the evaluation module is arranged to evaluate a goal function using the simulated deviation of the output voltage of the SMPS at each of the plurality of points to obtain a measure of at least one of a size and a recovery time of the respective output voltage deviation; and
the natural frequency estimator is arranged to estimate a location of a minimum of the goal function in the search space based on the evaluated values of the goal function, the location of the minimum of the goal function corresponding to the natural frequencies of the zeros; and
a control law parameter calculator arranged to calculate, based on the determined estimates of the natural frequencies of the zeros, the control law parameter values for tuning the feedback loop; and
a module that stores in the memory a configuration for the SMPS having the output filter with the capacitor configuration that is determined to be associated with the lowest value of the cost function from among the candidate configurations of capacitors.

23. The apparatus according to claim 22, wherein the cost assigned to each kind of capacitor is indicative of at least one of a price and a physical size of the kind of capacitor.

24. The apparatus according to claim 23, wherein the cost assigned to each kind of capacitor is indicative of a weighted sum of the price and the physical size of the kind of capacitor.

25. The apparatus according to claim 24, wherein:
at least one of the candidate configurations comprises a plurality of different arrangements of capacitors of different kinds in the output filter, all of the different arrangements being associated with the same value of the cost function; and
the candidate configuration generator module is arranged to select, for each of the at least one candidate configuration having a plurality of different arrangements of capacitors of different kinds in the output filter, an arrangement of capacitors from the plurality of different arrangements that are to be retained for the binary search, the selection being performed by:
selecting a subset of the plurality of different arrangements based on one of the total price and the total physical size of the capacitors in each of the plurality of different arrangements;
comparing a distribution of capacitors among the different kinds of capacitors in each of the arrangements in the subset with a target distribution; and
selecting an arrangement of capacitors that has the most similar distribution of capacitors among the different kinds of capacitors to the target distribution.

26. The apparatus according to claim 24, wherein:
at least one of the candidate configurations comprises a plurality of different arrangements of capacitors of different kinds in the output filter, all of the different arrangements being associated with the same value of the cost function; and
the candidate configuration generator module is arranged to select, for each of the at least one candidate configuration having a plurality of different arrangements of capacitors of different kinds in the output filter, an arrangement of capacitors from the plurality of different arrangements that are to be retained for the binary search, the selection being performed by:
selecting a subset of the plurality of different arrangements based on a total of the costs assigned to the capacitors in each of the plurality of different arrangements;
comparing a distribution of capacitors among the different kinds of capacitors in each of the arrangements in the subset with a target distribution; and
selecting an arrangement of capacitors that has the most similar distribution of capacitors among the different kinds of capacitors to the target distribution.

27. The apparatus according to claim 23, wherein:
at least one of the candidate configurations comprises a plurality of different arrangements of capacitors of different kinds in the output filter, all of the different arrangements being associated with the same value of the cost function; and
the candidate configuration generator module is arranged to select, for each of the at least one candidate configuration having a plurality of different arrangements of capacitors of different kinds in the output filter, an arrangement of capacitors from the plurality of different arrangements that are to be retained for the binary search, the selection being performed by:
selecting a subset of the plurality of different arrangements based on one of a total price and a total physical size of the capacitors in each of the plurality of different arrangements; and
selecting an arrangement from the subset based on the other of the total price and the total physical size of the capacitors in each of the arrangements in the subset.

28. The apparatus according to claim 23, wherein:
at least one of the candidate configurations comprises a plurality of different arrangements of capacitors of different kinds in the output filter, all of the different arrangements being associated with the same value of the cost function; and
the candidate configuration generator module is arranged to select, for each of the at least one candidate configuration having a plurality of different arrangements of capacitors of different kinds in the output filter an arrangement of capacitors from the plurality of different arrangements that are to be retained for the binary search, the selection being performed by:
  comparing a distribution of capacitors among the different kinds of capacitors in each of the plurality of different arrangements with a target distribution; and
  selecting an arrangement of capacitors that has the most similar distribution of capacitors among the different kinds of capacitors to the target distribution.

29. The apparatus according to claim 22, wherein the goal function provides a measure of at least one of a maximum SMPS output voltage deviation during the variation in load current of the SMPS, and a recovery time during which the output voltage of the SMPS returns to within a tolerance band of output voltage values following the variation in the load current of the SMPS.

30. The apparatus according to claim 29, wherein the goal function comprises $$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors, $w_{Vdev}$ and $W_R$ are weighting factors, and N and M are integers with N≥1 and M≥1.

31. The apparatus according to claim 29, wherein the goal function comprises $$\left[\frac{V_{Dev}}{V_{Dev\_Req}}\right]^K\left[\frac{T_R}{T_{R\_Req}}\right]^L,$$

wherein $V_{dev}$ denotes the maximum SMPS output voltage deviation, $T_R$ denotes the recovery time, $V_{Dev\_Req}$ and $T_{R\_Req}$ are normalization factors, and K and L are integers with K≥1 and L≥1.

32. The apparatus according to claim 29, wherein the goal function comprises $$[\int_0^{T_{trans}}|V_{out}(t)-V_{DC}|^N dt]^{1/N},$$

wherein $V_{out}(t)$ denotes the variation in the output voltage of the SMPS that occurs in response to the variation in the load current of the SMPS, $T_{trans}$ denotes the duration of the variation in the load current of the SMPS, $V_{DC}$ denotes a DC voltage from which the output voltage of the SMPS deviates in response to the variation in the load current of the SMPS, and N is an integer greater than or equal to 1.

33. The apparatus according to claim 22, wherein:
the natural frequency estimator is further arranged to:
  determine a respective natural frequency of each of two dominant poles in a transfer function corresponding to the model of the SMPS, the natural frequencies of the dominant poles being $NF_{pole1}$ and $NF_{pole2}$, where $NF_{pole1} \leq NF_{pole2}$; and
  define a triangular search area for the zeros in the search space, the triangular search area having vertices at points ($NF_{zeromin}$, $NF_{zeromin}$), ($NF_{zeromax}$, $NF_{zeromax}$), and one of ($NF_{zeromin}$, $NF_{zeromax}$) and ($NF_{zeromax}$, $NF_{zeromin}$), where $NF_{zeromin}=NF_{pole1}/r_{min}$, $NF_{zeromax}=NF_{pole2} \cdot r_{max}$, and $r_{min}$ and $r_{max}$ are range factors each between 1.5 and 3;
the output voltage deviation determining module is arranged to simulate, for each of a plurality of points in the triangular search area, a deviation of the output voltage of the SMPS that occurs in response to the variation in the load current of the SMPS, using the model of the SMPS and the model of the feedback loop;
the evaluation module is arranged to evaluate the goal function using the determined deviation of the output voltage of the SMPS at each of the plurality of points within the triangular search area to obtain the measure of at least one of the physical size and the recovery time of the respective output voltage deviation; and
the natural frequency estimator is arranged to estimate a location of the minimum of the goal function in the triangular search area based on the evaluated values of the goal function.

34. The apparatus according to claim 33, wherein the natural frequency estimator is arranged to calculate an estimate of the respective natural frequencies of the zeros by:
  (i) calculating a value of the goal function for each of the vertices of the triangular search area;
  (ii) replacing the vertex of the triangular search area yielding the greatest value of the goal function with a vertex within the search area that yields a smaller value of the goal function to generate a triangle within the search area that is defined by the vertex within the search area and the remaining vertices of the triangular search area;
  (iii) evaluating the goal function at the new vertex;
  (iv) replacing the vertex of the triangle yielding the greatest value of the goal function with a new vertex within the search area that yields a smaller value of the goal function to generate a new triangle within the search area;
  (v) repeating steps (iii) and (iv) to generate a series of triangles within the search area until a stopping criterion is met; and
  (vi) when the stopping criterion is met, estimating the location of the minimum of the goal function in the search area based on the evaluated values of the goal function to obtain an estimate of the natural frequencies of the zeros.

35. The apparatus according to claim 34, wherein the natural frequency estimator is arranged to select in step (vi) a point in or on the triangle generated in the final performance of step (iv), the coordinates of the selected point providing the estimate of the natural frequencies of the zeros.

36. The apparatus according to claim 22, wherein:
the evaluation module is further arranged to evaluate a second goal function using a prescribed deviation of the output voltage of the SMPS and the determined deviation of the output voltage of the SMPS at each of the plurality of points in the search space at which the deviation of the output voltage of the SMPS has been determined, to obtain a measure of how much the determined deviation of the output voltage exceeds the prescribed deviation of the output voltage in response to the variation in the load current of the SMPS; and
the natural frequency estimator is arranged to estimate the location of the minimum of the goal function in the search space based on the evaluated values of the goal function and the evaluated values of the second goal function.

37. The apparatus according to claim 33, wherein:
the evaluation module is further arranged to evaluate a second goal function using a prescribed deviation of the output voltage of the SMPS and the determined deviation of the output voltage of the SMPS at each of the plurality of points in the triangular search area to obtain a measure of how much the determined deviation of the output voltage exceeds the prescribed deviation of the output voltage in response to the variation in the load current of the SMPS, the natural frequency estimator is arranged to calculate an estimate of the respective natural frequencies of the zeros by:
- (i) calculating a value of the second goal function for each of the vertices of the triangular search area;
- (ii) replacing the vertex of the triangular search area yielding the greatest value of the second goal function with a new vertex within the search area that yields a smaller value of the second goal function to generate a triangle within the search area that is defined by the new vertex within the search area and the remaining vertices of the triangular search area;
- (iii) evaluating the second goal function at the new vertex;
- (iv) replacing the vertex of the triangle yielding the greatest value of the second goal function with a new vertex within the search area that yields a smaller value of the second goal function to generate a new triangle within the search area;
- (v) repeating steps (iii) and (iv) to generate a series of triangles within the search area until the second goal function is evaluated to be zero at the new vertex in step (iii) and has been evaluated to be zero at the remaining vertices of the triangle generated in the final performance of step (iv), the triangle generated in the final performance of step (iv) defining a restricted triangular search area;
- (vi) calculating a value of the goal function for each of the vertices of the restricted search area;
- (vii) replacing the vertex of the restricted search area yielding the greatest value of the goal function with a new vertex within the restricted search area that yields a smaller value of the goal function to generate a triangle within the restricted search area that is defined by the new vertex and the remaining vertices of the restricted search area;
- (viii) evaluating the goal function at the new vertex from step (vii);
- (ix) replacing the vertex of the triangle yielding the greatest value of the goal function with a new vertex within the restricted search area that yields a smaller value of the goal function to generate a new triangle within the restricted search area;
- (x) repeating steps (viii) and (ix) to generate a series of triangles within the restricted search area until a stopping criterion is met; and
- (xi) when the stopping criterion is met, estimating the location of the minimum of the goal function within the restricted search area based on the evaluated values of the goal function to obtain an estimate of the natural frequencies of the zeros.

38. The apparatus according to claim 37, wherein the natural frequency estimator is arranged to select in step (xi) a point in or on the triangle generated in the final performance of step (ix), the coordinates of the selected point providing the estimate of the natural frequencies of the zeros.

39. The apparatus according to claim 37, wherein the natural frequency estimator is further arranged to evaluate in step (viii) the second goal function at the new vertex from step (vii) and, when the second goal function is evaluated to be greater than zero at the new vertex from step (vii), to repeat steps (iv) to (viii), and otherwise to perform steps (ix) to (xi).

40. The apparatus according to claim 36, wherein the prescribed deviation of the output voltage of the SMPS follows a prescribed variation over time.

41. The apparatus according to claim 22, wherein the feedback loop comprises a PID regulator and the model of the feedback loop models the feedback loop as a PID regulator, the control law parameters comprising the P, I and D control parameters of the PID regulator.

* * * * *